(12) United States Patent
Bond et al.

(10) Patent No.: US 12,031,502 B2
(45) Date of Patent: Jul. 9, 2024

(54) GAS TURBINE ENGINE HAVING A HEAT EXCHANGER ARRANGEMENT HAVING AT LEAST ONE HEAT EXCHANGER MODULE OVERLAPPING ANOTHER HEAT EXCHANGER MODULE

(71) Applicant: Reaction Engines Limited, Abingdon (GB)

(72) Inventors: Robert Alexander Bond, Abingdon (GB); Kathryn Rebecca Evans, Abingdon (GB); Martin Christopher Johnson, Abingdon (GB); Russell Geoffrey Payne, Abingdon (GB)

(73) Assignee: Reaction Engines Limited, Abingdon (GB)

( * ) Notice: Subject to any disclaimer, the term of this patent is extended or adjusted under 35 U.S.C. 154(b) by 200 days.

(21) Appl. No.: 17/614,723

(22) PCT Filed: May 28, 2020

(86) PCT No.: PCT/EP2020/064820
§ 371 (c)(1),
(2) Date: Nov. 29, 2021

(87) PCT Pub. No.: WO2020/239899
PCT Pub. Date: Dec. 3, 2020

(65) Prior Publication Data
US 2022/0220924 A1    Jul. 14, 2022

(30) Foreign Application Priority Data

May 30, 2019 (GB) ...................................... 1907721

(51) Int. Cl.
*F02K 1/82* (2006.01)
*F02C 7/04* (2006.01)
(Continued)

(52) U.S. Cl.
CPC ................ *F02K 1/822* (2013.01); *F02C 7/04* (2013.01); *F02C 7/12* (2013.01); *F02C 7/224* (2013.01); *F02K 9/78* (2013.01)

(58) Field of Classification Search
CPC .... F02K 1/822; F02K 9/78; F02C 7/04; F02C 7/12; F02C 7/224; B64D 33/02
See application file for complete search history.

(56) References Cited

U.S. PATENT DOCUMENTS 3,477,505 A * 11/1969 McGann .................... F02C 7/08
165/DIG. 427
3,507,115 A *  4/1970 Wisoka ...................... F02C 7/08
165/166
(Continued)

FOREIGN PATENT DOCUMENTS

CN      107218133 A      9/2017
CN      110925097 B      1/2021
(Continued)

OTHER PUBLICATIONS

Corrected Examination Report for British Application No. 2112526.5, dated Jan. 6, 2022.
(Continued)

*Primary Examiner* — William H Rodriguez
(74) *Attorney, Agent, or Firm* — Wolf, Greenfield & Sacks, P.C.

(57) ABSTRACT

An engine comprises an air intake arrangement configured to receive air; a heat exchanger arrangement arranged downstream of the air intake arrangement, configured to cool the air, and comprising a plurality of heat exchanger modules; and one or more turbomachinery components configured to receive cooled air from the heat exchanger arrangement. The plurality of heat exchanger modules are arranged to be generally centred on and to be arranged along a longitudinal axis of the engine. At least one of the plurality of heat
(Continued)

exchanger modules is arranged to at least partially overlap with at least one other one of the plurality of heat exchanger modules relative to the longitudinal axis of the engine.

20 Claims, 11 Drawing Sheets

(51) Int. Cl.
  *F02C 7/12* (2006.01)
  *F02C 7/224* (2006.01)
  *F02K 9/78* (2006.01)

(56) References Cited

U.S. PATENT DOCUMENTS

| | | | | |
|---|---|---|---|---|
| 3,638,719 | A * | 2/1972 | McGann | F28F 21/082 |
| | | | | 165/DIG. 400 |
| 3,740,949 | A * | 6/1973 | Wolf | F02C 7/224 |
| | | | | 60/768 |
| 3,747,339 | A * | 7/1973 | Wolf | F02C 7/143 |
| | | | | 60/206 |
| 4,782,658 | A * | 11/1988 | Perry | F02C 7/14 |
| | | | | 60/39.08 |
| 5,085,041 | A * | 2/1992 | Scott-Scott | F02K 9/78 |
| | | | | 60/257 |
| 5,101,622 | A | 4/1992 | Bond | |
| 2004/0026572 | A1 * | 2/2004 | Burton | F25J 3/04084 |
| | | | | 244/171.1 |
| 2005/0183413 | A1 * | 8/2005 | Kojima | F02K 9/805 |
| | | | | 60/247 |
| 2015/0101334 | A1 * | 4/2015 | Bond | F02K 9/00 |
| | | | | 165/82 |
| 2016/0114898 | A1 * | 4/2016 | Llamas Castro | F02C 7/047 |
| | | | | 415/177 |
| 2022/0112839 | A1 * | 4/2022 | Wong | F02C 7/14 |
| 2022/0260018 | A1 * | 8/2022 | Sidorovich Paradiso | |
| | | | | F02C 7/14 |

FOREIGN PATENT DOCUMENTS

| | | | |
|---|---|---|---|
| CN | 114439646 A | * | 5/2022 |
| EP | 3 179 074 A1 | | 6/2017 |
| GB | 870 265 A | | 6/1961 |
| GB | 2 238 080 A | | 5/1991 |
| GB | 2 240 815 A | | 8/1991 |
| WO | WO 2017/075717 A1 | | 5/2017 |
| WO | WO-2022051849 A1 | * | 3/2022 |

OTHER PUBLICATIONS

International Search Report and Written Opinion for International Application No. PCT/EP2020/064820, dated Feb. 10, 2021.
Combined Search and Examination Report for British Application No. 1907721.3, dated Nov. 25, 2019.
Office Action for Japanese Application No. 2021-570773, dated Jan. 30, 2024.

* cited by examiner

GAS TURBINE ENGINE HAVING A HEAT EXCHANGER ARRANGEMENT HAVING AT LEAST ONE HEAT EXCHANGER MODULE OVERLAPPING ANOTHER HEAT EXCHANGER MODULE

RELATED APPLICATIONS

This application is a national stage filing under 35 U.S.C. § 371 of International Patent Application No. PCT/EP2020/064820, filed May 28, 2020, entitled "ENGINE" which claims priority to GB Patent Application No. 1907721.3, filed May 30, 2019. The entire contents of these applications are incorporated herein by reference in their entirety.

FIELD

The present disclosure relates to engines, in particular precooled engines, such as of the type which may be used in aerospace applications, and to a method of operating such an engine.

The disclosure also relates to an aircraft, flying machine or aerospace vehicle comprising such an engine.

BACKGROUND

Efficient air-breathing propulsion for flight from low speed to high Mach (e.g. above Mach 2.5) can require the integration of several engine types (for example, an air-breathing engine and a rocket engine, or a turbomachinery based engine and a Ramjet) into a single system, with carefully managed transitions between the various modes of operation provided by the different engine types, as thrust falls in one mode while thrust in another mode rises. The Mach number at which these transitions between different modes of operation occurs is largely a result of temperature limitations. For example, where a system is configured to operate using turbomachinery and a Ramjet, typically there will be a transition from turbomachinery to Ramjet operation at a flight Mach where neither mode is optimised. This is because if, for example, material temperature limits in the turbomachinery are hit early and throttling thus occurs at lower supersonic speeds, well before the Ramjet kicks in to produce good thrust performance, this results in a gap/deficiency in overall thrust performance, in which the propulsion system struggles to provide sufficient thrust to continue acceleration. If the temperature of the intake air entering the engine could be controlled (i.e. reduced below stagnation), then the transition point for a given engine mode could be at higher Mach. This would allow the various engine modes to be better optimised, and for greater flexibility of operation through the transition speeds. It could even allow for some engine modes to be removed completely. One means of controlling the air temperature entering the engine is by precooling.

US2015/0275762 describes a cooling system for a turbine engine including a heat exchanger in fluid communication with a first fluid inlet stream and disposed upstream and in fluid communication with a core engine. The heat exchanger is operative to cool the first fluid inlet stream. The heat exchanger includes a heat exchanger inlet for input of a heat exchanging medium for exchange of heat from the first fluid inlet stream to the heat exchanging medium. The heat exchanger further includes a heat exchanger outlet for discharge of a heated output stream into one of a turbine of a downstream engine, an augmentor or a combustor of the core engine. The heated output stream provides an additional flow to the downstream engine. A turbine engine including the cooling system is also described.

WO2015052469 describes a heat exchanger which may be used in an engine, such as a vehicle engine for an aircraft or orbital launch vehicle. The heat exchanger may be configured as generally drum-shaped with a multitude of spiral sections, each containing numerous small diameter tubes. The spiral sections may spiral inside one another. The heat exchanger may include a support structure with a plurality of mutually axially spaced hoop supports, and may incorporate an intermediate header. The heat exchanger may incorporate recycling of methanol or other antifreeze used to prevent blocking of the heat exchanger due to frost or ice formation.

GB2238080 describes a hybrid propulsion system for a transatmospheric or hypersonic cruise vehicle comprising a pre-cooled air-breathing jet engine and a rocket motor. Previously ice formed on the inlet cooling heat exchanger at altitudes where there is significant humidity sufficiently to deleteriously affect jet thrust. The rocket motor is therefore operated temporarily to compensate for the loss of jet thrust when icing is present and during defrost. The rocket motor is mounted co-axially with the jet pipe which exhausts through an annular orifice into a common propelling nozzle. The arrangement avoids transverse thrust vectors as the relative engine thrusts vary which would cause the vehicle to pitch or yaw. The air inlet heat exchange is intermittently by-passed via a line to allow deicing.

The present disclosure seeks to alleviate, at least to a certain degree, the problems and/or address at least to a certain extent, the difficulties associated with the prior art.

SUMMARY

According to a first aspect of the disclosure, there is provided an engine, comprising:
an air intake arrangement configured to receive air;
a heat exchanger arrangement arranged downstream of the air intake arrangement, configured to cool the air, and comprising a plurality of heat exchanger modules; and one or more turbomachinery components configured to receive cooled air from the heat exchanger arrangement;
wherein:
the plurality of heat exchanger modules are arranged to be generally centred on and to be arranged along a longitudinal axis of the engine;
and
at least one of the plurality of heat exchanger modules is arranged to at least partially overlap with at least one other one of the plurality of heat exchanger modules relative to the longitudinal axis of the engine.

Advantageously, such an engine may provide the ability to reduce the temperature of air entering the engine. Additionally, the transitions between different modes of operation of the engine may be better managed. In particular, the transition points for a given engine mode may be at a higher Mach. As such, different modes of operating the engine may be optimised, and there may be greater flexibility of operation through the transition speeds between different engine modes. The engine modes may even be removed completely. In addition, such an engine may provide for improved hot day performance (e.g. performance when the environmental conditions are at a relatively hot temperature compared with a typical environmental temperature) of the one or more turbomachinery components. Furthermore, the heat exchanger modules may advantageously allow a proportion of the air to pass through each of the heat exchanger modules and be cooled by a heat transfer medium flowing through the heat exchanger modules.

At least one of the plurality of heat exchanger modules may be arranged to partially overlap with at least one other one of the plurality of heat exchanger modules relative to the longitudinal axis of the engine. A respective portion of at least one of the plurality of heat exchanger modules may be arranged to extend beyond or over, or overhang from, a respective end of an adjacent one of the other heat exchanger modules along the longitudinal axis of the engine, to provide the partial overlap.

The modular structure of the heat exchanger arrangement provides that the engine may be configured such that the flow of a heat transfer medium in one or more of the heat exchanger modules may be modulated or completely turned off separately (i.e. independently from the flow of a heat transfer medium in the other heat exchanger modules). Additionally, the heat exchanger modules of the engine may provide that a proportion of the air may pass through each heat exchanger module and be cooled by a heat transfer medium in the heat exchanger arrangement. Advantageously, this may further provide for improved optimisation, flexibility and control of the temperature profile of the air flowing through the engine.

The overlap of the plurality of heat exchanger modules relative to the longitudinal axis of the engine may advantageously provide for a reduced overall length of the heat exchanger arrangement and hence of the engine, and may be particularly suitable where the angle of air flow through the heat exchanger arrangement has an axial element and is not desired to be purely radial. Said overlap may be chosen so as to optimise the radial temperature distribution of the flow in the heat exchanger arrangement and to balance this with minimising any unwanted aerodynamic effects. For example, said overlap may be chosen to be partial only (i.e. for the heat exchanger modules not to fully overlap with one another relative to the longitudinal axis of the engine).

Furthermore, precooling the air entering the engine reduces the temperature operating range over which the one or more turbomachinery components must operate. This may advantageously provide, for example, for a decrease in the extent to which the tip clearances of a compression system of the one or more turbomachinery components must be managed over the temperature operating range of the one or more turbomachinery components. This may provide for improved tip clearance losses in the one of more turbomachinery components and corresponding engine handling improvements, thus resulting in an increase in overall mission efficiency (fuel burn).

Accordingly, such an engine may provide for the careful management of the transitions between various modes of operation of the engine, for an increase in the maximum flight Mach number of the operation of the one or more turbomachinery components, and for a reduction in the impact of transitions between different engine modes on a mission profile, thus increasing the maximum operational flight speed of the engine. Additionally, such an engine may allow for a Ramjet system to be included in the engine that has a reduced cross-sectional area, which may provide for better airframe integration.

The plurality of heat exchanger modules are arranged to be generally centred on the longitudinal axis of the engine. This may mean, for example, that each of the heat exchanger modules has a centre (e.g. if one of the heat exchanger modules is approximately cylindrical, then its centre is determined by the radial centre of the circular face of said cylindrical heat exchanger module) that is arranged to be generally coincident with the longitudinal axis of the engine.

The plurality of heat exchanger modules are arranged along the longitudinal axis of the engine. This may mean, for example, that a first one of the heat exchanger modules may be arranged at a position along the longitudinal axis of the engine that is proximate to the air intake arrangement and is upstream of all of the other heat exchanger modules. A last one of the heat exchanger modules may be arranged at a position along the longitudinal axis of the engine that is proximate to the one or more turbomachinery components and is downstream of all of the other heat exchanger modules. If the plurality of heat exchanger modules comprises more than two heat exchanger modules, then the remaining heat exchanger modules may be arranged along the longitudinal axis of the engine between the first heat exchanger module and the last heat exchanger module.

The intake arrangement may be configured for the flow of subsonic, supersonic and/or hypersonic air.

The one or more turbomachinery components may comprise a compressor. The one or more turbomachinery components may further comprise a turbine configured to drive the compressor.

The engine may further comprise an air-breathing combustion chamber configured to receive compressed air from the compressor and for the combustion of air and fuel.

The engine may further comprise an augmentation system such as a reheat or afterburner system.

The engine may further comprise one or more nozzles, such as one or more variable area nozzles.

The engine may further comprise an exhaust.

The engine may comprise an air-breathing jet engine, wherein the one or more turbomachinery components may comprise a compressor and a turbine.

The engine may further comprise a Ramjet for high Mach (e.g. above Mach 2.5) operation of the engine. The Ramjet may be configured to be supplied by air that bypasses the one or more turbomachinery components and that optionally may also bypass the heat exchanger arrangement. Advantageously, the Ramjet may be used as the main thrust source. The Ramjet may be run jointly with the one or more turbomachinery components during a mode transition of the engine. Advantageously, the heat exchanger arrangement may be used when the one or more turbomachinery components reach a material temperature limit, such as in a compression system of the one or more turbomachinery components, as the flight speed of the engine increases during operation of the engine. This may advantageously raise the maximum operational flight speed of the engine at which the one or more turbomachinery components could be operated.

The heat exchanger arrangement may comprise an inlet and an outlet. The inlet of the heat exchanger arrangement may be configured to be supplied with a heat transfer medium by an inlet manifold, and the outlet of the heat exchanger arrangement may be configured to supply the heat transfer medium to an outlet manifold. The inlet manifold and/or the outlet manifold may be cylindrical or longitudinal in shape.

The heat transfer medium may be any fuel type, any gas, any liquid, and/or any cryogenic fluid, for example, the heat transfer medium may be helium.

The heat transfer medium may comprise a fuel, or the heat transfer medium may comprise a fluid that is different to and separate to (i.e. fluidly isolated from) a fuel used in the engine.

The heat transfer medium may comprise a fluid that is different to and separate to (i.e. fluidly isolated from) a fuel used in the engine, and the engine may further comprise a second heat exchanger arrangement configured to provide for heat transfer between said heat transfer medium and said fuel.

The fuel may comprise hydrogen.

The fuel may be provided in liquid form or cryogenic form, for example, the fuel may comprise liquid hydrogen.

One or more of each of the plurality of heat exchanger modules may be annular in shape.

One or more of each of the plurality of heat exchanger modules may be at least partially substantially cylindrical or conical in shape, or may be any other substantially annular shape centred on the longitudinal axis of the engine. Advantageously, a substantially cylindrical heat exchanger module may provide for a simple construction of said heat exchanger module. A substantially conical heat exchanger module may provide for a slimmer engine installation where diameter is at a premium, and may also provide for protection from debris and objects, thus aiding the compactness and effectiveness of the heat exchanger arrangement in the engine.

Each of the plurality of heat exchanger modules may have a respective inner diameter and a respective outer diameter.

The plurality of heat exchanger modules may be sized such that they get progressively larger or smaller in diameter along the length of the longitudinal axis of the engine. In other words, the respective inner diameters of each of the plurality of heat exchanger modules may be chosen such that a first one of the plurality of heat exchangers arranged proximate the air intake arrangement has a smaller inner diameter than all of the other plurality of heat exchanger modules; a last one of the plurality of heat exchangers arranged proximate the one or more turbomachinery components has a larger inner diameter than all of the other plurality of heat exchanger modules; and if the plurality of heat exchanger modules comprises more than two heat exchanger modules, then the respective inner diameters of the remaining plurality of heat exchanger modules arranged between the first and last heat exchanger modules gradually increase relative to the downstream direction of the engine. Similarly, in other words, the respective outer diameters of each of the plurality of heat exchanger modules may be chosen such that a first one of the plurality of heat exchangers arranged proximate the air intake arrangement has a smaller outer diameter than all of the other plurality of heat exchanger modules; a last one of the plurality of heat exchangers arranged proximate the one or more turbomachinery components has a larger outer diameter than all of the other plurality of heat exchanger modules; and if the plurality of heat exchanger modules comprises more than two heat exchanger modules, then the respective outer diameters of the remaining plurality of heat exchanger modules arranged between the first and last heat exchanger modules gradually increase relative to the downstream direction of the engine.

The one or more turbomachinery components may comprise an engine fan case having an outer diameter. At least one of the plurality of heat exchanger modules may be sized and positioned such that the inner diameter of said at least one of the plurality of heat exchanger modules is in line (i.e. substantially coincident with) the outer diameter of the engine fan case, relative to the radial direction of the engine. Advantageously, this may minimise blockage to the one or more turbomachinery components. The precise inner and outer diameters of the plurality of heat exchanger modules may be chosen according to the aerodynamic considerations of a particular application.

At least one of the plurality of heat exchanger modules may have a different inner and/or outer diameter than at least one other one of the plurality of heat exchanger modules.

The longitudinal axis of the engine may be at least partially curved, e.g. there may be some degree of convolution in the air intake arrangement.

The plurality of heat exchanger modules may be orientated along the longitudinal axis of the engine. Advantageously, this may provide that the heat exchanger arrangement may be closely integrated with the air intake arrangement. The use of a plurality of modular heat exchanger modules may help facilitate this integration by providing for the careful arrangement of the axial positioning, orientation and/or size of the plurality of heat exchanger modules along the longitudinal axis of the engine. Furthermore, the plurality of heat exchanger modules may be positioned and orientated along the longitudinal axis of the engine such that there may be provided complete protection from debris and particles that follow a mostly ballistic trajectory (rather than being carried along aerodynamic streamlines, for example).

Each of the plurality of heat exchanger modules has a respective length.

At least one of the plurality of heat exchanger modules may be arranged such that its respective length at least partially overlaps with the respective length of at least one other one of the plurality of heat exchanger modules, relative to the longitudinal axis of the engine. For example, at least one of the plurality of heat exchanger modules may be arranged such that at least approximately one sixth, one fifth, one quarter, one third or one half of the length of said at least one of the plurality of heat exchanger modules overlaps with the respective length of at least one other one of the plurality of heat exchanger modules, relative to the longitudinal axis of the engine.

At least one of the heat exchanger modules may have a different length to at least one other one of the plurality of heat exchanger modules. For example, at least one of the heat exchanger modules may have a length that is approximately one half of the length of at least one other one of the plurality of heat exchanger modules. Advantageously, the lengths of one or more of the heat exchanger modules may be chosen to be different to one another to provide an additional means to control the air flow through each of the heat exchanger modules.

Each of the plurality of heat exchanger modules may comprise a plurality of tubes for the flow of a heat transfer medium in heat exchange with the air.

The heat exchanger arrangement may comprise three or more heat exchanger modules, for example, three, four, five, six, or any other number of heat exchanger modules.

The plurality of heat exchanger modules may be arranged to be in fluid communication with one another.

The plurality of heat exchanger modules may be arranged in series and/or in parallel relative to the longitudinal axis of the engine.

Each of the plurality of heat exchanger modules may comprise a respective inlet for receiving air and a respective outlet for expelling air. The respective inlets of each of the plurality of heat exchanger modules may each be in fluid communication with a respective inlet manifold of each of the plurality of heat exchanger modules. The respective outlets of each of the plurality of heat exchanger modules may each be in fluid communication with a respective outlet manifold of each of the plurality of heat exchanger modules. The inlet manifold of one of the heat exchanger modules may be common with (e.g. directly connected to and/or in direct fluid communication with) the inlet manifold of the heat exchanger arrangement, and/or the outlet manifold of one of the heat exchanger modules may be common with (e.g. directly connected to and/or in direct fluid communication with) the outlet manifold of the heat exchanger arrangement.

One or more of the respective inlets and outlets of each of the plurality of heat exchanger modules may be overlapping (i.e. generally coincident along the longitudinal axis of the engine) with one another, and/or one or more of the respective inlets and outlets of each of the plurality of heat exchanger modules may be spaced apart from one another along the longitudinal axis of the engine.

The heat exchanger arrangement may be configured such that air is configured to flow into and through the heat exchanger arrangement substantially along the radial direction of the engine, i.e. to flow substantially perpendicular to the longitudinal axis of the engine.

The heat exchanger arrangement may be configured such that air is configured to flow into and through the heat exchanger arrangement having a component that is substantially parallel to the radial direction of the engine, and/or a component that is substantially parallel to the longitudinal axis of the engine.

The heat exchanger arrangement may be configured such that air is configured to flow around the plurality of tubes as it flows through the heat exchanger arrangement.

The plurality of tubes may be arranged to be each wound in a respective path that gradually widens or tightens about the longitudinal axis of the engine and each spaced apart from one another in rows along the longitudinal axis of the engine. For example, the plurality of tubes may be arranged in involute spiral paths, which may extend circumferentially about the longitudinal axis of the engine.

The plurality of tubes may be each connected at a first end thereof to an inlet header and at a second end thereof to an outlet header. The inlet header and the outlet header may each be arranged to extend substantially parallel to the longitudinal axis of the engine. The inlet header may be arranged to be in fluid communication with the inlet of the heat exchanger arrangement and the outlet header may be arranged to be in fluid communication with the outlet of the heat exchanger arrangement.

The plurality of tubes may be arranged relative to one another (e.g. spaced apart from and positioned relative to one another) such that during use of the engine, air may flow around the plurality of tubes in a perpendicular, or parallel, and/or combined direction. The plurality of tubes may be arranged to be straight and/or curved. For example, the plurality of tubes may be arranged to be curved at a fixed radius, curved with a varying radius, and/or in an involute spiral. The plurality of tubes may be arranged in-line relative to one another, and/or in a symmetrical and/or asymmetrical and/or random staggered arrangement, and/or in a random arrangement.

The plurality of tubes in at least one of the plurality of heat exchanger modules may be spaced apart and positioned relative to one another such that said one of the plurality of heat exchanger modules is configured to provide an angle to a bulk flow of the air flowing through the heat exchanger arrangement. Advantageously, the plurality of tubes may thus be arranged so as to provide an angle to a bulk flow of the air flowing through the heat exchanger arrangement. The spacing and/or the positioning of the plurality of tubes relative to one another may be chosen to advantageously use asymmetry to avoid co-operative forcing and resonance due to aero-elastic phenomena between the heat exchanger arrangement and the one or more turbomachinery components, and to help control aerodynamic effects such as pressure distortion. This may be achieved by, for example, randomised tube spacing (e.g. allowing large tolerances in the spacing of the tubes), or by systematic and selective variations in the spacing of the plurality of tubes relative to one another. In particular, the precise arrangement (e.g. the relative positioning and/or spacing) of the plurality of tubes relative to one another may be chosen according to a particular application such that: the air flow may exit the heat exchanger arrangement in a condition that is acceptable to the downstream one or more turbomachinery components without either the heat exchanger arrangement or the one or more turbomachinery components producing detrimental effects on each other; and such that allowance is made for thermal expansion by any unwinding of the plurality of tubes sliding relative to each other, which may occur if the tubes are arranged in involute spiral paths, for example.

The plurality of tubes in at least one of the plurality of heat exchanger modules may be arranged relative to one another (e.g. spaced apart from and positioned relative to one another) in a different arrangement to the plurality of tubes in at least one other one of the plurality of heat exchanger modules. Advantageously, this may provide that greater cooling is provided to one part of the air flow than the rest of the air flow through the engine. This may also provide that the surface area through which the air flows through the heat exchanger arrangement is increased, and may also provide for a slimmer engine installation.

The engine may further comprise an outer ducting and/or an inner centre structure configured to direct the air to flow from the air intake arrangement into the heat exchanger arrangement.

The engine may further comprise an outer case that forms a seal with the outer ducting.

The inner centre structure may comprise one or more movable sections. The one or more movable sections may be configured to be selectively moved to allow for the direct flow of air from the air intake arrangement to the one or more turbomachinery components, by bypassing the heat exchanger arrangement. The one or more movable sections may be configured to move by rotation, translation, a hinged means, and/or any other suitable mechanical means. Advantageously, the one or more movable sections of the inner centre structure may be moved to cause the air to bypass the heat exchanger arrangement. In other words, the one or more movable sections of the inner centre structure may provide for the direct flow of air through to the one or more turbomachinery components, thus bypassing the heat exchanger arrangement. This may be desirable when the engine is operating at low Mach or high corrected flows. In addition, the one or more movable sections may advantageously provide that the engine may be configured such that the flow of a heat transfer medium in one or more of the heat exchanger modules may be modulated or completely turned off separately (i.e. independently from the flow of a heat transfer medium in the other heat exchanger modules). Advantageously, this may provide for improved optimisation, flexibility and control of the temperature profile of the air flowing through the engine, by balancing pressure losses and temperature drops through the heat exchanger modules.

The engine may further comprise a plurality of turning vanes configured to direct the flow of air into and out of the heat exchanger arrangement. Advantageously, this may provide for the air flow to be directed onto and out of the heat exchanger arrangement.

The engine may further comprise a separator duct arranged on the outside of the heat exchanger arrangement. Advantageously, the separator duct may prevent debris and large particles that may be ingested into the air intake arrangement, from impacting on the heat exchanger arrangement.

The engine may further comprise one or more support structures arranged inside (i.e. proximate the inner diameter of), and/or outside (i.e. proximate the outer diameter of) at least one of the plurality of heat exchanger modules. Advantageously, the one or more support structures may help maintain the structural integrity of said at least one of the plurality of heat exchanger modules.

The engine may further comprise a bypass arrangement configured to prevent the air received by the air intake arrangement from flowing through at least one of the plurality of heat exchanger modules. Advantageously, this may provide for improved optimisation of the engine. Pressure losses through the heat exchanger arrangement and temperature drop requirements in the engine may be balanced. Additionally, pressure losses in the engine may be minimised when air cooling is not important (e.g. at low operating flight speeds of the engine).

Optionally, the at least one or more turbomachinery components comprises a compressor, and the engine further comprises an air-breathing combustion chamber configured to receive compressed air from the compressor and for the combustion of air and fuel;

wherein the heat exchanger is configured to be selectively operated in a first operating mode which corresponds with a first operating flight speed of the engine, and a second operating mode which corresponds with a second operating flight speed of the engine that is lower than the first operating flight speed of the engine;

wherein in the first operating mode of the heat exchanger arrangement, the heat transfer medium is configured to heat the fuel before it is delivered to the air-breathing combustion chamber; and wherein in the second operating mode of the heat exchanger arrangement, the heat transfer medium is configured to cool the fuel before it is delivered to the air-breathing combustion chamber.

Advantageously, such an engine may provide for improved management of the temperature of a fuel. In the first operating mode of the heat exchanger arrangement, which may correspond with a high operating flight speed of the engine, for example, a short duration hypersonic "dash" mode or cruise at high Mach, a portion of the heat transfer medium may be used to heat the fuel. The first operating mode of the heat exchanger arrangement is particularly advantageous because it may provide that during high speed flight, for example during a short duration hypersonic "dash" mode, during acceleration to high speed, heat removed into the heat transfer medium by cooling the incoming air may be dissipated (i.e. dumped) in the fuel. The fuel may represent a heat reservoir facilitating further cooling of the air. In other words, the fuel may provide a good medium for dumping heat out from the heat transfer medium, and dumping heat from the heated heat transfer medium into the fuel may thus help cool the air.

In the second operating mode of the heat exchanger arrangement, which may correspond with a low operating flight speed of the engine, for example, a long duration supersonic or subsonic cruise, the heat transfer medium may be used to cool the fuel. The second operating mode of the heat exchanger arrangement is thus particularly advantageous because it may provide that during low flight speed, for example during a long duration supersonic or subsonic cruise, heat dumped into the fuel from the heat transfer medium during the first operating mode of the heat exchanger arrangement may be transferred back into the heat transfer medium. Advantageously, this may allow for the operation of the heat exchanger arrangement in the first operating mode to be potentially repeated. In other words, without the second operating mode of the heat exchanger arrangement, it might not otherwise be possible to keep on using the first operating mode of the heat exchanger arrangement, because the fuel may ultimately reach a temperature limit.

By using both the first and second operating modes of the heat exchanger to run the cycle of the engine forwards and in reverse respectively, the heat transfer medium may effectively be used as both a heat source and a heat sink for the fuel. Specifically, the temperature of the fuel may need to be managed in order to effectively use the fuel as a heat sink for helping the heat transfer medium to more effectively cool the air. In the first operating mode of the heat exchanger arrangement, the fuel may provide a good medium for heat from the heat transfer medium to be dumped into, to help further cool the air, and in the second operating mode of the heat exchanger arrangement, the fuel may be cooled down so that the first operating mode may be repeated/used again.

In the second operating mode of the heat exchanger arrangement, the heat exchanger arrangement may be configured to operate in a reverse direction to the first operating mode of the heat exchanger arrangement.

The engine may further comprise a fuel tank for the storage of the fuel.

The engine may further comprise a first flow path for the flow of the heat transfer medium and extending between and in fluid communication with the outlet of the heat exchanger arrangement and a point in the engine downstream of the one or more turbomachinery components, such that in the first operating mode of the heat exchanger arrangement, a portion of the heat transfer medium may be used for re-heating and/or a Ramjet mode of operating the engine.

The engine may further comprise a second flow path for the flow of the heat transfer medium and extending between and in fluid communication with the outlet of the heat exchanger arrangement and an inlet of the fuel tank, such that in the first and second operating modes of the heat exchanger arrangement, a portion of the heat transfer medium may be placed in heat exchange with the fuel in the fuel tank.

The engine may further comprise a third flow path for the flow of the heat transfer medium and extending between and in fluid communication with an outlet of the fuel tank and the inlet of the heat exchanger arrangement, such that in the first and second operating modes of the heat exchanger arrangement, the portion of the heat transfer medium that is placed in heat exchange with the fuel in the fuel tank may then be configured to re-enter the heat exchanger arrangement.

Advantageously, in the first operating mode of the heat exchanger arrangement, hot heat transfer medium which exits the heat exchanger arrangement after it has been used to cool the air flowing through the heat exchanger arrangement may then be used to heat the fuel in the fuel tank. Cold heat transfer medium (which has been cooled as a result of heating the fuel) exiting the fuel tank may then be fed back into the heat transfer arrangement where it may be used to cool the air flowing through the heat exchanger arrangement. In addition, advantageously, in the second operating mode of the heat exchanger arrangement, heat transfer medium which exits the heat exchanger arrangement after it has been used to warm the air flowing through the heat exchanger arrangement may be used to cool the fuel in the fuel tank. Hot heat transfer medium (which has been heated as a result of cooling the fuel) exiting the fuel tank may then be fed back into the heat exchanger arrangement where it may be used to warm the air flowing through the heat exchanger arrangement.

According to a second aspect of the disclosure, there is provided an engine, comprising: an air intake arrangement configured to receive air;

a heat exchanger arrangement arranged downstream of the air intake arrangement and configured to cool the air; and one or more turbomachinery components configured to receive cooled air from the heat exchanger arrangement;

wherein the heat exchange arrangement is at least partially substantially conical in shape.

Advantageously, such an engine may provide a slimmer engine and may be particularly suitable for an installation where diameter is at a premium. The length of the heat exchanger arrangement may be chosen so as to optimise the length and diameter of the engine. The conical shape of the heat exchanger arrangement may also provide for protection from debris and objects, thus aiding the compactness and effectiveness of the heat exchanger arrangement in the engine.

Additionally, such an engine may provide the ability to reduce the temperature of air entering the engine. Additionally, the transitions between different modes of operation of the engine may be better managed. In particular, the transition points for a given engine mode may be at a higher Mach. As such, different modes of operating the engine may be optimised, and there may be greater flexibility of operation through the transition speeds between different engine modes. The engine modes may even be removed completely. In addition, such an engine may provide for improved hot day performance (e.g. performance when the environmental conditions are at a relatively hot temperature compared with a typical environmental temperature) of the one or more turbomachinery components.

Furthermore, precooling the air entering the engine reduces the temperature operating range over which the one or more turbomachinery components must operate. This may advantageously provide, for example, for a decrease in the extent to which the tip clearances of a compression system of the one or more turbomachinery components must be managed over the temperature operating range of the one or more turbomachinery components. This may provide for improved tip clearance losses in the one of more turbomachinery components and corresponding engine handling improvements, thus resulting in an increase in overall mission efficiency (fuel burn).

Accordingly, such an engine may provide for the careful management of the transitions between various modes of operation of the engine, for an increase in the maximum flight Mach number of the operation of the one or more turbomachinery components, and for a reduction in the impact of transitions between different engine modes on a mission profile, thus increasing the maximum operational flight speed of the engine. Additionally, such an engine may allow for a Ramjet system to be included in the engine that has a reduced cross-sectional area, which may provide for better airframe integration.

The heat exchanger arrangement may comprise an inlet and an outlet. The inlet and the outlet of the heat exchanger may be spaced apart from one another relative to a radial direction of the engine that is substantially parallel to a longitudinal axis of the engine.

The heat exchanger arrangement may comprise a plurality of heat exchanger modules that are each at least partially substantially conical in shape.

Each of the plurality of heat exchanger modules may comprise a respective inlet and a respective outlet. The plurality of heat exchanger modules may be in fluid communication with one another. The plurality of heat exchanger modules may be arranged in series and/or parallel relative to a longitudinal axis of the engine. Advantageously, this may allow for a shorter engine installation.

The plurality of heat exchanger modules may be arranged in series or in parallel relative to a longitudinal axis of the engine. The longitudinal axis of the engine may be at least partially curved, e.g. there may be some degree of convolution in the air intake arrangement.

Each of the plurality of heat exchanger modules may comprise a plurality of tubes for the flow of a heat transfer medium in heat exchange with the air.

Optionally, the plurality of tubes in at least one of the plurality of heat exchanger modules are spaced apart and positioned relative to one another such that said one of the plurality of heat exchanger modules is configured to provide an angle to a bulk flow of the air flowing through the heat exchanger arrangement.

The engine may further comprise a bypass arrangement configured to prevent the air received by the air intake arrangement from flowing through at least one of the plurality of heat exchanger modules.

Optionally, the at least one or more turbomachinery components comprises a compressor, and the engine further comprises an air-breathing combustion chamber configured to receive compressed air from the compressor and for the combustion of air and fuel;

wherein the heat exchanger is configured to be selectively operated in a first operating mode which corresponds with a first operating flight speed of the engine, and a second operating mode which corresponds with a second operating flight speed of the engine that is lower than the first operating flight speed of the engine;

wherein in the first operating mode of the heat exchanger arrangement, the heat transfer medium is configured to heat the fuel before it is delivered to the air-breathing combustion chamber; and wherein in the second operating mode of the heat exchanger arrangement, the heat transfer medium is configured to cool the fuel before it is delivered to the air-breathing combustion chamber.

Advantageously, such an engine may provide for improved management of the temperature of a fuel. In the first operating mode of the heat exchanger arrangement, which may correspond with a high operating flight speed of the engine, for example, a short duration hypersonic "dash" mode or cruise at high Mach, a portion of the heat transfer medium may be used to heat the fuel. The first operating mode of the heat exchanger arrangement is particularly advantageous because it may provide that during high speed flight, for example during a short duration hypersonic "dash" mode, during acceleration to high speed, heat removed into the heat transfer medium by cooling the incoming air may be dissipated (i.e. dumped) in the fuel. The fuel may represent a heat reservoir facilitating further cooling of the air. In other words, the fuel may provide a good medium for dumping heat out from the heat transfer medium, and dumping heat from the heated heat transfer medium into the fuel thus may help cool the air.

In the second operating mode of the heat exchanger arrangement, which may correspond with a low operating flight speed of the engine, for example, a long duration supersonic or subsonic cruise, the heat transfer medium may be used to cool the fuel. The second operating mode of the heat exchanger arrangement is thus particularly advantageous because it may provide that during low flight speed, for example during a long duration supersonic or subsonic cruise, heat dumped into the fuel from the heat transfer medium during the first operating mode of the heat exchanger arrangement may be transferred back into the heat transfer medium. Advantageously, this may allow for the operation of the heat exchanger arrangement in the first operating mode to be potentially repeated. In other words, without the second operating mode of the heat exchanger arrangement, it might not otherwise be possible to keep on using the first operating mode of the heat exchanger arrangement, because the fuel may ultimately reach a temperature limit.

By using both the first and second operating modes of the heat exchanger to run the cycle of the engine forwards and in reverse respectively, the heat transfer medium may effectively be used as both a heat source and a heat sink for the fuel. Specifically, the temperature of the fuel may need to be managed in order to effectively use the fuel as a heat sink for helping the heat transfer medium to more effectively cool the air. In the first operating mode of the heat exchanger arrangement, the fuel may provide a good medium for heat from the heat transfer medium to be dumped into, to help further cool the air, and in the second operating mode of the heat exchanger arrangement, the fuel may be cooled down so that the first operating mode may be repeated/used again.

In the second operating mode of the heat exchanger arrangement, the heat exchanger arrangement may be configured to operate in a reverse direction to in the first operating mode of the heat exchanger arrangement.

The engine may further comprise a fuel tank for the storage of the fuel.

The engine may further comprise a first flow path for the flow of the heat transfer medium and extending between and in fluid communication with the outlet of the heat exchanger arrangement and a point in the engine downstream of the one or more turbomachinery components, such that in the first operating mode of the heat exchanger arrangement, a portion of the heat transfer medium may be used for re-heating and/or a Ramjet mode of operating the engine.

The engine may further comprise a second flow path for the flow of the heat transfer medium and extending between and in fluid communication with the outlet of the heat exchanger arrangement and an inlet of the fuel tank, such that in the first and second operating modes of the heat exchanger arrangement, a portion of the heat transfer medium may be placed in heat exchange with the fuel in the fuel tank.

The engine may further comprise a third flow path for the flow of the heat transfer medium and extending between and in fluid communication with an outlet of the fuel tank and the inlet of the heat exchanger arrangement, such that in the first and second operating modes of the heat exchanger arrangement, the portion of the heat transfer medium that is placed in heat exchange with the fuel in the fuel tank may then be configured to re-enter the heat exchanger arrangement.

Advantageously, in the first operating mode of the heat exchanger arrangement, hot heat transfer medium which exits the heat exchanger arrangement after it has been used to cool the air flowing through the heat exchanger arrangement may then be used to heat the fuel in the fuel tank. Cold heat transfer medium (which has been cooled as a result of heating the fuel) exiting the fuel tank may then be fed back into the heat transfer arrangement where it may be used to cool the air flowing through the heat exchanger arrangement. In addition, advantageously, in the second operating mode of the heat exchanger arrangement, heat transfer medium which exits the heat exchanger arrangement after it has been used to warm the air flowing through the heat exchanger arrangement may be used to cool the fuel in the fuel tank. Hot heat transfer medium (which has been heated as a result of cooling the fuel) exiting the fuel tank may then be fed back into the heat exchanger arrangement where it may be used to warm the air flowing through the heat exchanger arrangement.

It is to be understood that the engine according to the second aspect of the disclosure may further comprise any one or more of the optional features recited above in relation to the engine according to the first aspect of the disclosure. These are not recited herein in relation to the engine according to the second aspect of the disclosure, purely for the sake of conciseness.

According to a third aspect of the disclosure, there is provided an engine, comprising: an air intake arrangement configured to receive air;

a fuel tank configured to store a fuel for being supplied to an air-breathing combustion chamber;

a heat exchanger arrangement arranged downstream of the air intake arrangement and configured to cool the air by providing for heat exchange between the air and a heat transfer medium; and a compressor arranged downstream of the heat exchanger arrangement and configured to supply compressed air to the air-breathing combustion chamber for the combustion of the air and the fuel;

wherein the heat exchanger arrangement is configured to be selectively operated in a first operating mode which corresponds with a first operating flight speed of the engine, and a second operating mode which corresponds with a second operating flight speed of the engine that is lower than the first operating flight speed of the engine;

wherein in the first operating mode of the heat exchanger arrangement, the heat transfer medium is configured to heat the fuel before the fuel is delivered to the air-breathing combustion chamber; and wherein in the second operating mode of the heat exchanger arrangement, the heat transfer medium is configured to cool the fuel before the fuel is delivered to the air-breathing combustion chamber.

Advantageously, such an engine may provide for improved management of the temperature of a fuel. In the first operating mode of the heat exchanger arrangement, which may correspond with a high operating flight speed of the engine, for example, a short duration hypersonic "dash" mode or cruise at high Mach, a portion of the heat transfer medium may be used to heat the fuel. The first operating mode of the heat exchanger arrangement is particularly advantageous because it may provide that during high speed flight, for example during a short duration hypersonic "dash" mode, during acceleration to high speed, heat removed into the heat transfer medium by cooling the incoming air may be dissipated (i.e. dumped) in the fuel. The fuel may represent a heat reservoir facilitating further cooling of the air. In other words, the fuel may provide a good medium for dumping heat out from the heat transfer medium, and dumping heat from the heated heat transfer medium into the fuel thus may help cool the air.

In the second operating mode of the heat exchanger arrangement, which may correspond with a low operating flight speed of the engine, for example, a long duration supersonic or subsonic cruise, the heat transfer medium may be used to cool the fuel. The second operating mode of the heat exchanger arrangement is thus particularly advantageous because it may provide that during low speed operation of the engine, for example during a long duration supersonic or subsonic cruise, heat dumped into the fuel from the heat transfer medium during the first operating mode of the heat exchanger arrangement may be transferred back into the heat transfer medium. Advantageously, this may allow for the operation of the heat exchanger arrangement in the first operating mode to be potentially repeated. In other words, without the second operating mode of the heat exchanger arrangement, it might not otherwise be possible to keep on using the first operating mode of the heat exchanger arrangement, because the fuel may ultimately reach a temperature limit.

By using both the first and second operating modes of the heat exchanger to run the cycle of the engine forwards and in reverse respectively, the heat transfer medium may effectively be used as both a heat source and a heat sink for the fuel. Specifically, the temperature of the fuel needs to be managed in order to effectively use the fuel as a heat sink for helping the heat transfer medium to more effectively cool the air. In the first operating mode of the heat exchanger arrangement, the fuel may provide a good medium for heat from the heat transfer medium to be dumped into, to help further cool the air, and in the second operating mode of the heat exchanger arrangement, the fuel may be cooled down so that the first operating mode may be repeated/used again.

In the second operating mode of the heat exchanger arrangement, the heat exchanger arrangement may be configured to operate in a reverse direction to in the first operating mode of the heat exchanger arrangement.

The engine may further comprise a first flow path for the flow of the heat transfer medium and extending between and in fluid communication with the outlet of the heat exchanger arrangement and a point in the engine downstream of the one or more turbomachinery components, such that in the first operating mode of the heat exchanger arrangement, a portion of the heat transfer medium may be used for re-heating and/or a Ramjet mode of operating the engine.

The engine may further comprise a second flow path for the flow of the heat transfer medium and extending between and in fluid communication with the outlet of the heat exchanger arrangement and an inlet of the fuel tank, such that in the first and second operating modes of the heat exchanger arrangement, a portion of the heat transfer medium may be placed in heat exchange with the fuel in the fuel tank.

The engine may further comprise a third flow path for the flow of the heat transfer medium and extending between and in fluid communication with an outlet of the fuel tank and the inlet of the heat exchanger arrangement, such that in the first and second operating modes of the heat exchanger arrangement, the portion of the heat transfer medium that is placed in heat exchange with the fuel in the fuel tank may then be configured to re-enter the heat exchanger arrangement.

Advantageously, in the first operating mode of the heat exchanger arrangement, hot heat transfer medium which exits the heat exchanger arrangement after it has been used to cool the air flowing through the heat exchanger arrangement may then be used to heat the fuel in the fuel tank. Cold heat transfer medium (which has been cooled as a result of heating the fuel) exiting the fuel tank may then be fed back into the heat transfer arrangement where it may be used to cool the air flowing through the heat exchanger arrangement. In addition, advantageously, in the second operating mode of the heat exchanger arrangement, heat transfer medium which exits the heat exchanger arrangement after it has been used to warm the air flowing through the heat exchanger arrangement may be used to cool the fuel in the fuel tank. Hot heat transfer medium (which has been heated as a result of cooling the fuel) exiting the fuel tank may then be fed back into the heat exchanger arrangement where it may be used to warm the air flowing through the heat exchanger arrangement.

The heat exchanger arrangement may comprise a plurality of heat exchanger modules.

It is to be understood that the engine according to the third aspect of the disclosure may further comprise any one or more of the optional features recited above in relation to the engines according to the first and second aspects of the disclosure. These are not recited herein in relation to the engine according to the third aspect of the disclosure, purely for the sake of conciseness.

According to a fourth aspect of the disclosure, there is provided a method of operating an engine according to the third aspect of the disclosure, the method comprising:

suppling air to the air intake arrangement;

causing the air to flow through the air intake arrangement, the heat exchanger arrangement, the compressor and the air-breathing combustion chamber;

supplying heat transfer medium to the heat exchanger arrangement;

causing the heat transfer medium to flow through the heat exchanger arrangement;

supplying fuel to the fuel tank; and causing the fuel to flow from the fuel tank to the air-breathing combustion chamber;

wherein the method further comprises operating the heat exchanger arrangement in the first operating mode when the engine is operating at the first operating flight speed, and operating the heat exchanger arrangement in the second operating mode when the engine is operating at the second operating flight speed.

According to a fifth aspect of the disclosure, there is provided an aircraft, flying machine or aerospace vehicle comprising an engine according to any one of the first, second or third aspects of the disclosure.

BRIEF DESCRIPTION OF THE DRAWINGS

The present disclosure may be carried out in various ways and embodiments of the disclosure will now be described by way of example with reference to the accompanying drawings, in which.

DETAILED DESCRIPTION

Figure 1:
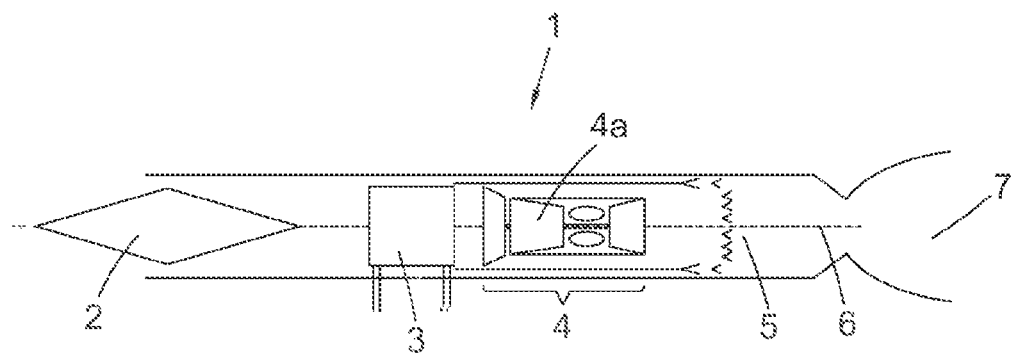
FIG. 1 (prior art) shows a cross-sectional schematic view of a precooled engine.

FIG. 1 (prior art) shows a cross-sectional schematic view of a precooled turbomachinery based engine 1 having a supersonic/hypersonic air intake arrangement 2. Arranged downstream of the air intake arrangement 2 is a cylindrical heat exchanger 3 configured to cool air received by the air intake arrangement 2. Air cooled by the heat exchanger 3 is then configured to flow to turbomachinery components 4, before flowing downstream to an augmentation system 5 (reheat/afterburner), a variable area nozzle 6 and then an exhaust 7. The heat exchanger 3 is positioned in close proximity to the turbomachinery components 4 such that the two may be considered to be close-coupled, i.e. the aerodynamic flow field from the heat exchanger 3 influences the turbomachinery components 4, and the turbomachinery components 4 can have an upstream aerodynamic influence on the heat exchanger 3. For high Mach (e.g. above Mach 2.5) operation, the engine 1 also includes a Ramjet, supplied by air that bypasses the turbomachinery components 4, and that can also optionally bypass the heat exchanger 3. At high Mach (e.g. above Mach 2.5), the Ramjet will be the main thrust source. The Ramjet can be run jointly with the turbomachinery components 4 during mode transition. The heat exchanger 3 can be used when the turbomachinery components 4 reach a material temperature limit, typically in a compression system 4a, as flight speed of the engine 1 increases. This would be in order to raise the maximum operational flight speed of the engine 1 at which the turbomachinery components 4 could be used.

Alternative heat exchanger arrangements which may be used in place of the heat exchanger 3 shall now be discussed, with reference to the cross-sectional schematic views of FIGS. 2 to 12D. The exemplary engines described in relation to FIGS. 2 to 12D shall be discussed with a focus on their respective heat exchanger arrangements. It is to be understood that the engines described below may additionally include any one or more of the features of the engine 1 shown in FIG. 1, and may also include one or more optional additional and/or alternative features.

Figure 2:
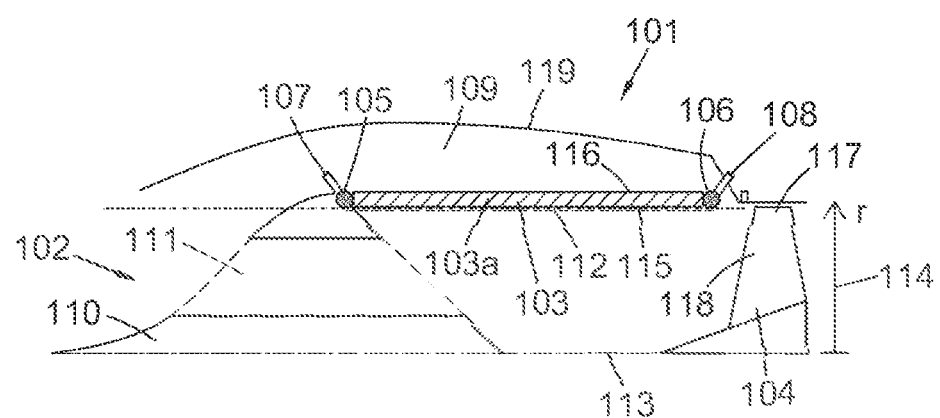
FIG. 2 shows a cross-sectional schematic view of a precooled engine having a single cylindrical heat exchanger module.

FIG. 2 shows a cross-sectional schematic view of an exemplary alternative precooled turbomachinery based engine 101, for example an air-breathing jet engine, having an air intake arrangement 102. Arranged downstream of the air intake arrangement 102 is a heat exchanger arrangement 103 configured to cool air received by the air intake arrangement 102. Air cooled by the heat exchanger arrangement 103 is then configured to flow to turbomachinery components 104 (e.g. a compressor and a turbine, as in a typical jet engine). The turbomachinery based engine 101 may also include an augmentation system (reheat/afterburner), a variable area nozzle, an exhaust, and/or a Ramjet, which are similar to those as described above in relation to FIG. 1, but which are not shown in FIG. 2.

For example, the engine 101 may further comprise a Ramjet (not shown), supplied by air that bypasses the turbomachinery components 104, and that can also optionally bypass the heat exchanger arrangement 103. At high Mach (e.g. above Mach 2.5) the Ramjet will be the main thrust source. The Ramjet can be run jointly with the turbomachinery components 104 during mode transition. The heat exchanger 103 can be used when the turbomachinery components 104 reach a material temperature limit, typically in a compression system (not shown) of the turbomachinery components 104, as the flight speed of the engine 101 increases. This would be in order to raise the maximum operational flight speed of the engine 101 at which the turbomachinery components 104 could be used.

In the example shown in FIG. 2, the heat exchanger arrangement 103 comprises a first heat exchanger module 103a that is centred about a longitudinal axis 113 of the engine 101 (FIG. 2 is a cross-sectional schematic view showing only half of the engine 101). In the example, the first heat exchanger module 103a is substantially cylindrical in shape, though it is also envisaged that the first heat exchanger module may alternatively be substantially conical (see FIG. 8), or any other suitable shape. A heat transfer medium (not shown) in heat exchange with the air is configured to flow within the heat exchanger module 103a, in through an inlet 105 of the heat exchanger arrangement 103 and out through an outlet 106 of the heat exchanger arrangement 103. The inlet 105 is supplied with the heat transfer medium by an inlet manifold 107, and the outlet 106 is in fluid communication with an outlet manifold 108. In the example shown, the inlet and outlet manifolds 107, 108 are both cylindrical, but it is also envisaged that the inlet and outlet manifolds 107 and 108 may be any other shape, for example they may be longitudinal manifolds on either side of the heat exchanger arrangement 103. The heat transfer medium can be, for example, any fuel type, any gas, any liquid, or any cryogenic fluid, such as helium.

The first heat exchanger module 103*a* has an inner diameter 115 and an outer diameter 116. The first heat exchanger module 103*a* is sized and positioned such that the inner diameter 115 is approximately in line with an outer diameter 117 of an engine fan case 118 of the turbomachinery components 104. Advantageously, this may minimise blockage to the turbomachinery components 104. The precise inner and outer diameters 115, 116 of the heat exchanger module 103*a* may be chosen according to the aerodynamic considerations of a particular application.

The air is configured to flow into and through the heat exchanger arrangement 103 substantially along a radial direction 114 of the engine 101, that is perpendicular to the longitudinal axis 113 of the engine 101. In particular, outer ducting 109 and an inner centre structure 110 of the engine 101 are configured to direct the air to flow from the air intake arrangement 102 into the heat exchanger arrangement 103. The outer ducting 109 forms a seal with a case 119 of the engine 101. The inner centre structure 110 comprises one or more movable sections 111. The one or more movable sections 111 are configured to be selectively moved to allow for the direct flow of air through from the air intake arrangement 102 to the turbomachinery components 104, thus bypassing the heat exchanger arrangement 103. For example, the one or more movable sections 111 may be moved to cause the air to bypass the heat exchanger arrangement 103 when the engine 101 is operating at low Mach or high corrected flows. The one or more movable sections 111 may be configured to move by rotation, translation, a hinged petal arrangement, and/or any other suitable mechanical means. The engine 101 also includes a plurality of turning vanes (not shown) configured to direct the flow of air into and out of the heat exchanger arrangement 103. The engine 101 also includes a separator duct (not shown), arranged on the outside of the heat exchanger arrangement 103 (i.e. proximate the outer diameter 116 of the heat exchanger module 103*a*) to prevent debris and large particles that may be ingested into the intake, from impacting on the heat exchanger arrangement 103. It is envisaged that the separator duct could be sized to be large enough to allow a complete engine bypass.

Figure 3A:
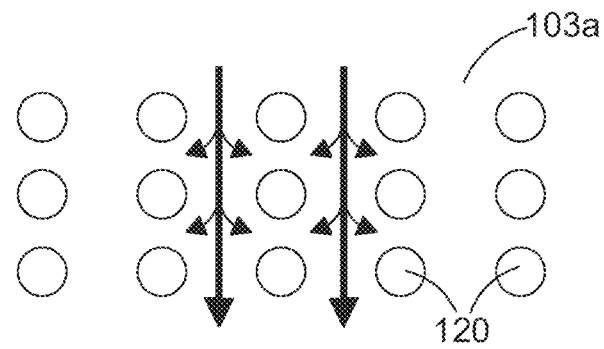
FIG. 3A shows a cross-sectional schematic view of coolant tubes of a heat exchanger in an in-line arrangement.
Figure 3B:
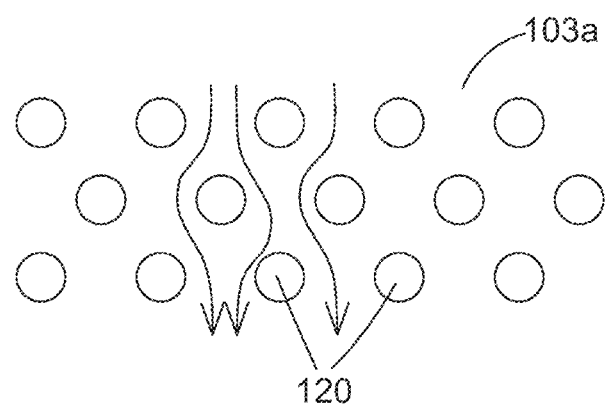
FIG. 3B shows a cross-sectional schematic view of coolant tubes of a heat exchanger in a symmetrically staggered arrangement.
Figure 3C:
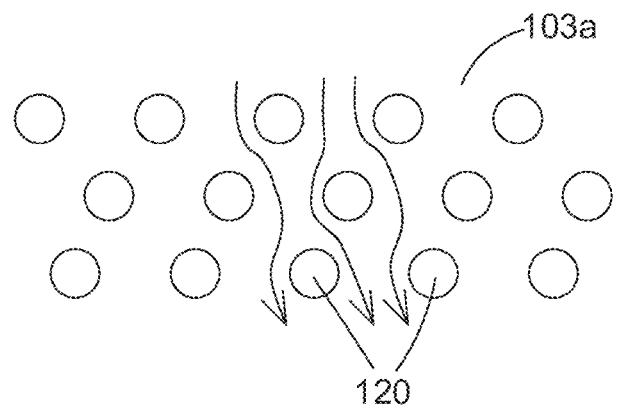
FIG. 3C shows a cross-sectional schematic view of coolant tubes of a heat exchanger in a staggered arrangement.

With reference to the cross-sectional schematic views of FIGS. 3A to 3C, the first heat exchanger module 103*a* comprises a plurality of small diameter thin-walled tubes 120 through which the heat transfer medium is configured to flow. The tubes 120 are shown in cross-section in FIGS. 3A to 3C. The air is configured to flow around the plurality of tubes as it flows through the first heat exchanger module 103*a*, as depicted by the arrows in FIGS. 3A to 3C.

In an example, the tubes 120 are arranged in involute spiral paths, which extend circumferentially about the longitudinal 113 of the engine, i.e. in a plane that is perpendicular to the page in FIG. 2. In particular, the tubes 120 are each wound in a respective path that gradually widens or tightens about the longitudinal axis 113 of the engine 101 and are each spaced apart from one another in rows along the longitudinal axis 113 of the engine 101. The tubes 120 are connected at a first end thereof to an inlet header (not shown) and at a second end thereof to an outlet header (not shown). The inlet header and the outlet header each extends substantially parallel to the longitudinal axis 113 of the engine 101. The inlet header is arranged to be in fluid communication with the inlet 105 and the outlet header is arranged to be in fluid communication with the outlet 106. Though, it is also envisaged that the tubes 120 may be arranged and/or positioned in any other path and/or orientation.

The tubes 120 are arranged relative to one another such that air flows around the tubes 120 in a perpendicular, or parallel, or combined direction. Physically, the tubes in the first heat exchanger module 103*a* can be arranged to be straight, simply curved at a fixed radius, curved with a varying radius, and/or an involute spiral. In such arrangements, the air may flow over multiple tubes. In the airflow direction for these arrangements, the tubes 120 can be arranged in-line (see FIG. 3A), symmetrical staggered (see FIG. 3B), or staggered (see FIG. 3C), in such a way as to provide an angle to the bulk flow of the air. In these and other examples, the spacing and the positioning of the tubes 120 relative to one another can be chosen to use asymmetry to avoid co-operative forcing and resonance due to aeroelastic phenomena between the heat exchanger arrangement 103 and the closely-coupled turbomachinery components 104. This can be achieved by randomised tube spacing (e.g. allowing large tolerances in the spacing of the tubes 120), or by systematic and selective variations in the spacing of the tubes 120. In particular, the precise arrangement (e.g. the relative positioning and/or spacing) of the tubes 120 relative to one another may be chosen according to a particular application such that: the air flow exits the heat exchanger arrangement 103 in a condition that is acceptable to the downstream turbomachinery components 104 without either the heat exchanger 103 or the turbomachinery components 104 producing detrimental effects on each other; and such that allowance is made for thermal expansion by any unwinding of tubes 120 sliding relative to each other, which may occur if the tubes 120 are arranged in involute spiral paths, for example, like those described above and/or in WO2015052469.

In the example shown in FIG. 2, a squirrel-cage/drum-like structure 112 is arranged inside the first heat exchanger module 103*a* (i.e. proximate the inner diameter 115 of the heat exchanger module 103*a*) to maintain structural integrity of the first heat exchanger module 103*a*. Though, it is also envisaged that one or more squirrel-cage/drum-like structures may alternatively be arranged outside, or both inside and outside the heat exchanger module 103*a*.

Precooling the air using the heat exchanger arrangement 103 before it enters the turbomachinery components 104 is advantageous because it raises the maximum flight Mach number of the operation of the turbomachinery components 104 and thus reduces the impact of transition between engine modes on a mission profile. Additionally, it reduces the cross-sectional area of a Ramjet system within the engine 101, which provides for better airframe integration. It also provides for improved hot day performance (e.g. performance when the environmental conditions are at a relatively hot temperature compared with a typical environmental temperature) of the turbomachinery components 104.

Figure 4:
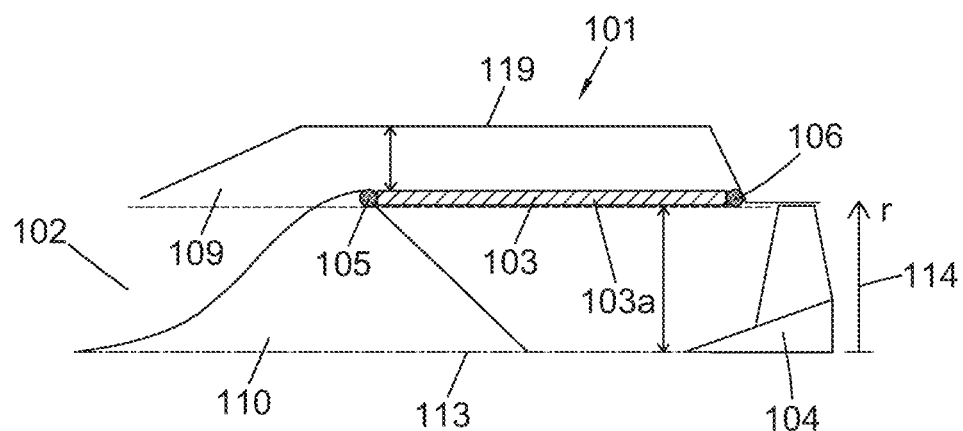
FIG. 4 shows another cross-sectional schematic view of the precooled engine of FIG. 2.

To assist with the following discussion, FIG. 4 shows a simplified cross-sectional schematic view of the engine 101 of FIG. 2. The inlet and outlet manifolds 107, 108 and the one or more movable sections 111 are not shown in FIG. 4.

This is because the focus of the following discussion, in relation to FIGS. 5 to 12D, shall be alternative structural configurations of the heat exchanger arrangement 103.

With reference to the cross-sectional schematic views of FIGS. 5 to 12D, alternative structural configurations of the heat exchanger arrangement 103 shall now be described. In FIGS. 5 to 12D, like reference numerals are used to denote alike elements, for example, the longitudinal axis 113 and the air intake arrangement 102. Similar reference numerals increasing in value are used to denote similar elements, for example, heat exchanger arrangements 103, 203, 403 etc. It is to be understood that other than their internal structural configurations and shapes, the alternative exemplary heat exchanger arrangements 203, 403, 503 etc. shall be considered to be similar to the heat exchanger arrangement 103. For example, the heat exchanger arrangements 203, 403, 503 etc. shall be considered to be functionally and positionally related to the other components such as the air intake arrangement 102 and the turbomachinery components 104 in the same way as the heat exchanger arrangement 103.

Figure 5:
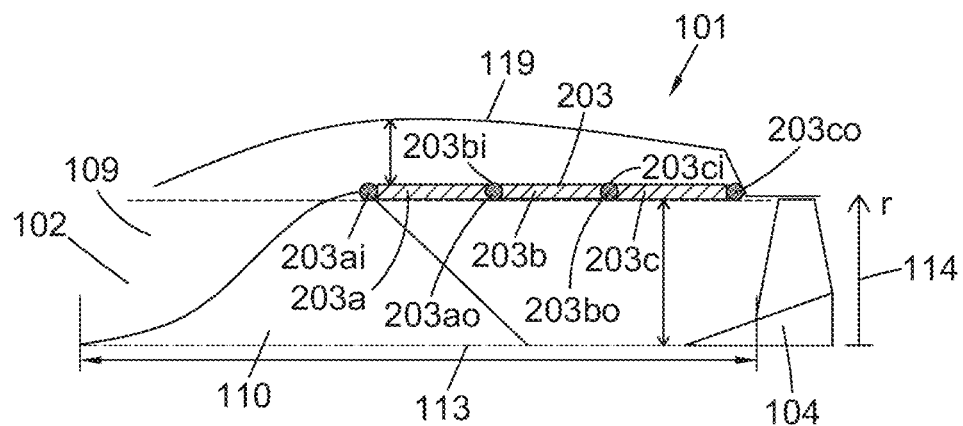
FIG. 5 shows a cross-sectional schematic view of a precooled engine having three cylindrical modular heat exchanger modules arranged in series.

In the example shown in FIG. 5, the heat exchanger arrangement 203 comprises a first heat exchanger module 203a, a second heat exchanger module 203b and a third heat exchanger module 203c, that are each substantially identical in structure to the first heat exchanger module 103a. Like the first heat exchanger module 103a in the example of FIG. 2, each of the first, second and third heat exchanger modules 203a-c comprises a plurality of small diameter thin-walled tubes running from a respective inlet 203ai, 203bi, 203ci to a respective outlet 203ao, 203bo, 203co, through which the heat transfer medium is configured to flow. Although there are three heat exchanger modules shown in the example of FIG. 5, it is also envisaged that the heat exchanger arrangement 203 may alternatively comprise any number of a plurality of heat exchanger modules.

The first, second and third heat exchanger modules 203a-c are arranged to be in fluid communication with one another and are arranged in series relative to the longitudinal axis 113 of the engine 101. In other words, the second heat exchanger module 203b is arranged downstream of the first heat exchanger module 203a, and the third heat exchanger module 203c is arranged downstream of the second heat exchanger module 203b. Though, it is also envisaged that one or more of the first, second and third heat exchanger modules 203a-c may alternatively be arranged in parallel relative to the longitudinal axis 113 of the engine 101.

The heat transfer medium in heat exchange with the air is configured to flow within the heat exchanger arrangement 203 through all of the first, second and third heat exchanger modules 203a-c by entering each module in through its respective inlet 203ai, 203bi, 203ci, and then exiting each module out through its respective outlet 203ao, 203bo, 203co.

Each of the inlets 203ai, 203bi, 203ci and the outlets 203ao, 203bo and 203co of the first, second and third heat exchanger modules 203a-c is in fluid communication with a respective inlet or outlet manifold (not shown). This is akin to how in the example shown in FIG. 2, the inlet 105 is supplied with the heat transfer medium by an inlet manifold 107 and the outlet 106 is in fluid communication with an outlet manifold 108.

The outlet 203ao and the inlet 203bi, and the outlet 203bo and the inlet 203ci are shown to be overlapping (i.e. generally coincident along the longitudinal axis 113 of the engine 101) in the example of FIG. 5. Though it is also envisaged that the outlet 203ao and the inlet 203bi, and/or the outlet 203bo and the inlet 203ci may also be spaced apart from one another along the longitudinal axis 113 of the engine 101 (for example as in the example shown in FIG. 6).

Referring back to FIG. 5, the modular structure of the heat exchanger arrangement 203 provides that the engine 101 may be configured such that the flow of the first fluid in one or more of the heat exchanger modules 203a-c can be modulated or completely turned off separately (i.e. independently from the flow of the first fluid in the other heat exchanger modules). Advantageously, this can provide for improved optimisation, flexibility and control of the temperature profile of the air.

Figure 6:
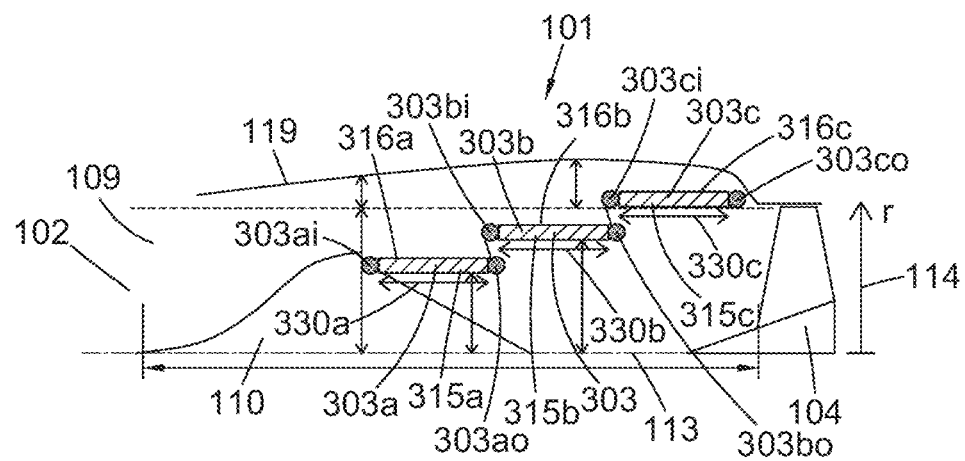
FIG. 6 shows a cross-sectional schematic view of a precooled engine having three cylindrical radially spaced modular heat exchanger modules arranged in series.

In another example shown in FIG. 6, the heat exchanger 303 comprises first, second and third heat exchanger modules 303a-c that are substantially identical in structure to the first heat exchanger module 103a, and each having an inner diameter 315a-c respectively, and an outer diameter 316a-c respectively. The first, second and third heat exchanger modules 303a-c are sized such that they get progressively larger in diameter. In other words, the inner diameter 315b is larger than the inner diameter 315a but smaller than the inner diameter 315c, and the outer diameter 316b is larger than the outer diameter 316a but smaller than the outer diameter 316c. In this example, the first, second and third heat exchanger modules 303a-c may therefore be referred to as being spaced apart from one another relative to the radial direction 114 of the engine 101. The structural configuration of the heat exchanger arrangement 303 may allow a proportion of the air to pass through each and be cooled by the heat transfer medium flowing through the first, second and third heat exchanger modules 303a-c. The radially spaced modular structure of the heat exchanger arrangement 303 provides that the engine 101 may be configured such that the flow of the first fluid in one or more of the heat exchanger modules 303a-c can be modulated or completely turned off separately (i.e. independently from the flow of the first fluid in the other heat exchanger modules). This could be provided for by a plurality of movable sections 111 (as described above in relation to FIG. 2), and/or by fluidic control, for example. Advantageously, this can provide for improved optimisation, flexibility and control of the temperature profile of the air, by balancing pressure losses and temperature drops through the heat exchanger modules 303a-c.

In the example shown in FIG. 6, the first, second and third heat exchanger modules 303a-c each has a respective equal length 330a-c. Though, it is also envisaged that one or more of the first, second and third heat exchanger modules 303a-c could have a different length to the other(s) of the heat exchanger modules 303a-c. The lengths 330a-c of the heat exchanger modules 303a-c may be chosen to be different to one another to provide an additional means to control the air flow through each of the heat exchanger modules 303a-c.

The spacings and positionings of the tubes 120 in each of the heat exchanger modules 103a-c can be chosen to be different to in the other heat exchanger modules 303a-c. Although there are three heat exchanger modules shown in the example of FIG. 6, it is also envisaged that the heat exchanger arrangement 303 may alternatively comprise any number of a plurality of heat exchanger modules.

Figure 7:
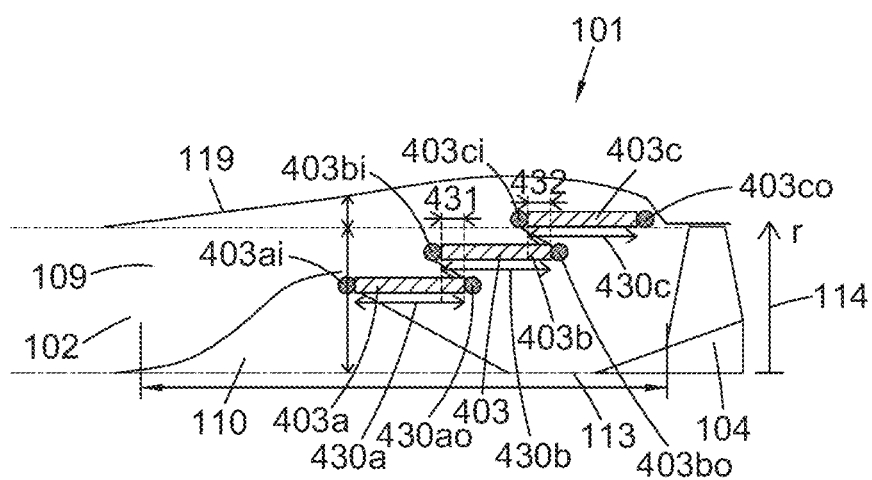
FIG. 7 shows a cross-sectional schematic view of a precooled engine having three cylindrical radially spaced and longitudinally overlapping modular heat exchangers arranged in series.

The example shown in FIG. 7 differs from that shown in FIG. 6 in that the first, second and third heat exchanger modules 403a-c of the heat exchanger arrangement 403 are arranged along the longitudinal axis 113 of the engine 101 such that their respective lengths 430a-c at least partially overlap by distances 431 and 432. In particular, as shown in FIG. 7, the length 430b of the second heat exchanger module 403b is arranged to partially overlap with the length 430a of the first heat exchanger module 403a at one end thereof, and at the other end thereof to overlap with the length 430c of the third heat exchanger module 430c. In this example, the first, second and third heat exchanger modules 403a-c may therefore be referred to as being partially overlapping with one another along the longitudinal axis 113 of the engine 101, as well as being spaced apart from one another relative to the radial direction 114 of the engine 101. This longitudinally overlapping arrangement advantageously provides for a reduced overall length of the heat exchanger arrangement 403 and hence of the engine 101, and may be particularly suitable where the angle of air flow through the heat exchanger arrangement 403 has an axial element and is not desired to be purely radial. Although there are three heat exchanger modules shown in the example of FIG. 7, it is also envisaged that the heat exchanger arrangement 203 may alternatively comprise any number of a plurality of heat exchanger modules. In the example shown in FIG. 7, the length 430b of the second heat exchanger module 403b is arranged to overlap the length 403a of the first heat exchanger module 403a and the length 403c of the third heat exchanger module 403c each by approximately one third of the length 430b of the second heat exchanger module 403b, relative to the longitudinal axis 113 of the engine 101. Though, it is also envisaged that the first, second and third heat exchanger modules 403a-c of the heat exchanger arrangement 103 may be arranged such that their respective lengths 430a-c at least partially overlap relative to the longitudinal axis 113 of the engine 101 by any other amount, for example by approximately one sixth, one fifth, one quarter or one half of the length of one of said lengths 430a-c.

Figure 8:
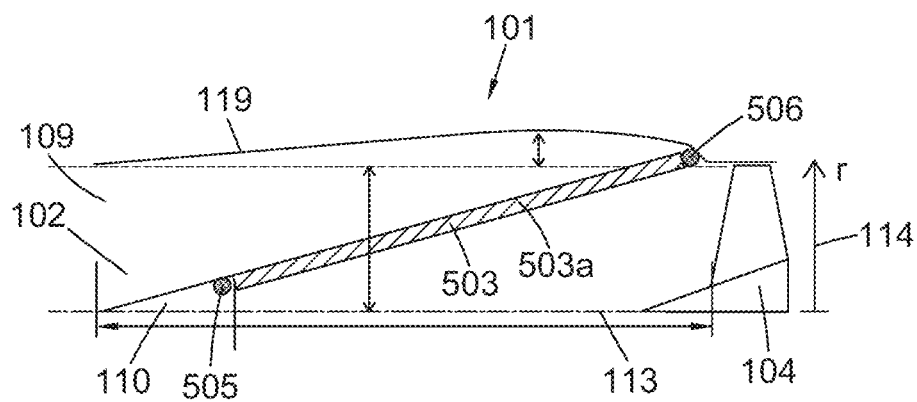
FIG. 8 shows a cross-sectional schematic view of a precooled engine having a single conical heat exchanger module.

An alternative heat exchanger arrangement 503 comprising a single heat exchanger module 503a (similar to the arrangements shown in FIGS. 2 and 4) is shown in FIG. 8. In this example, the heat exchanger arrangement 503 is substantially conical in shape. In other words, the inlet 505 and the outlet 506 are spaced apart from one another along the radial direction 114 of the engine 101. The conically shaped heat exchanger arrangement 503 can advantageously provide a slimmer installation and may be particularly suitable for an installation where diameter is at a premium.

Figure 9:
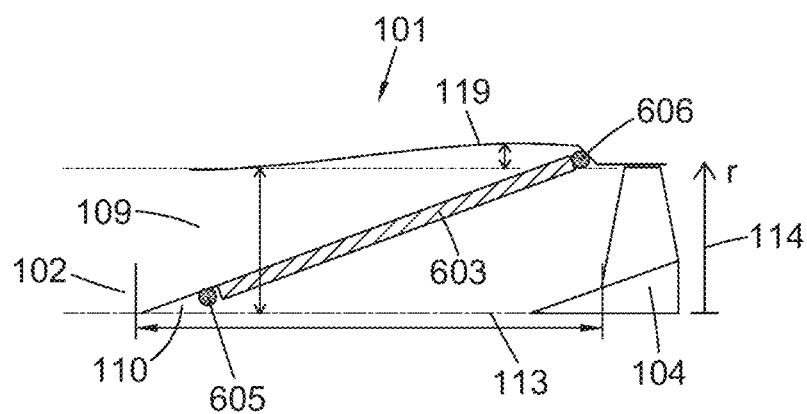
FIG. 9 shows a cross-sectional schematic view of a precooled engine having a single conical heat exchanger module.

A similar example is shown in FIG. 9, in which the heat exchanger arrangement 603 has a shorter length than that shown in the example of FIG. 8. The length of a conical heat exchanger arrangement 503, 603 may be chosen so as to optimise the length and diameter of the engine 101.

Figure 10:
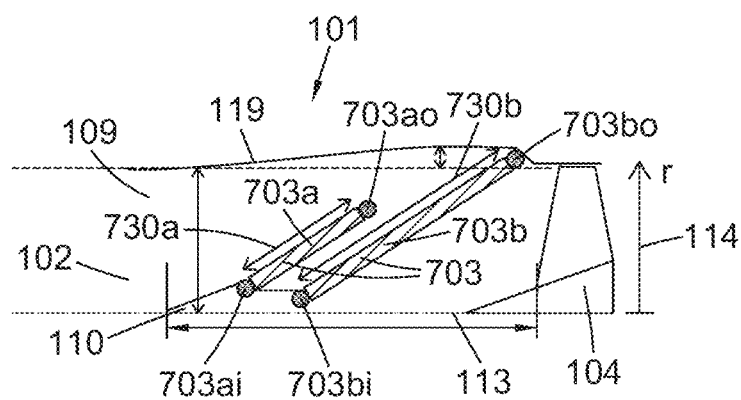
FIG. 10 shows a cross-sectional schematic view of a precooled engine having two conical modular heat exchanger modules arranged in series.
Figure 11:
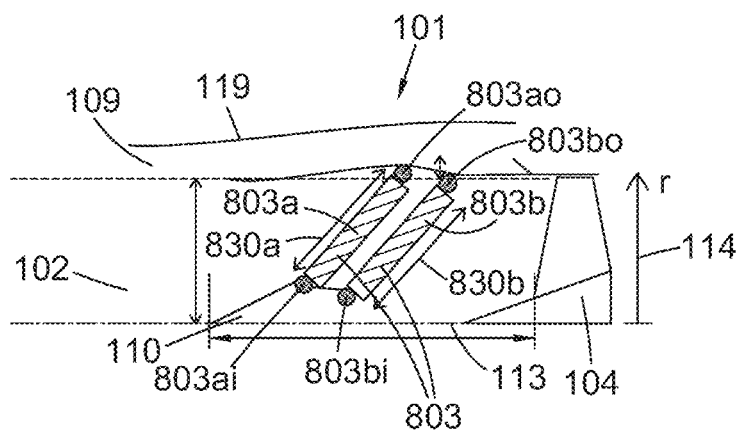
FIG. 11 shows a cross-sectional schematic view of a precooled engine having two conical modular heat exchanger modules arranged in series.

The heat exchanger arrangement 703 shown in FIG. 10 comprises a first heat exchanger module 703a and a second heat exchanger module 703b, each having a respective inlet 703ai, 703bi, and a respective outlet 703ao, 703bo. Similarly to the arrangement shown in FIG. 5, the first and second heat exchanger modules 703a and 703b are arranged to be in fluid communication with one another and are arranged in series relative to the longitudinal axis 113 of the engine 101. In other words, the second heat exchanger module 703b is arranged downstream of the first heat exchanger module 703a. Though, it is also envisaged that the first and second heat exchanger modules 703a and 703b may alternatively be arranged in parallel. Advantageously, this may allow for a shorter installation. In the example, one of the first and second heat exchanger modules 703a and 703b has a different arrangement of the tubes 120 inside said module compared with the other of the first and second heat exchanger modules 703a and 703b. Advantageously, this may provide that greater cooling is provided to one part of the air flow than the rest of the air flow.

In the example shown in FIG. 10, the first heat exchanger module 703a has a length 730a that is shorter than a length 730b of the second heat exchanger module 703b. In the example, the length 730a is approximately half of the length 730b, though it is also envisaged that the lengths 730a and 730b be also be any other relative lengths. It is also envisaged that alternatively the length 730a of the first heat exchanger module 703a may be longer than the length 730b of the second heat exchanger module 703b, or the first and second heat exchanger modules 703a, 703b may be approximately equal in length, as in the example shown in FIG. 11, wherein the first heat exchanger module 803a has a length 830a that is equal to a length 830b of the second heat exchanger module 803b. Although there are two heat exchanger modules shown in the examples of FIGS. 10 and 11, it is also envisaged that the heat exchanger arrangements 703 and 803 may alternatively comprise any number of a plurality of heat exchanger modules.

Figure 12A:
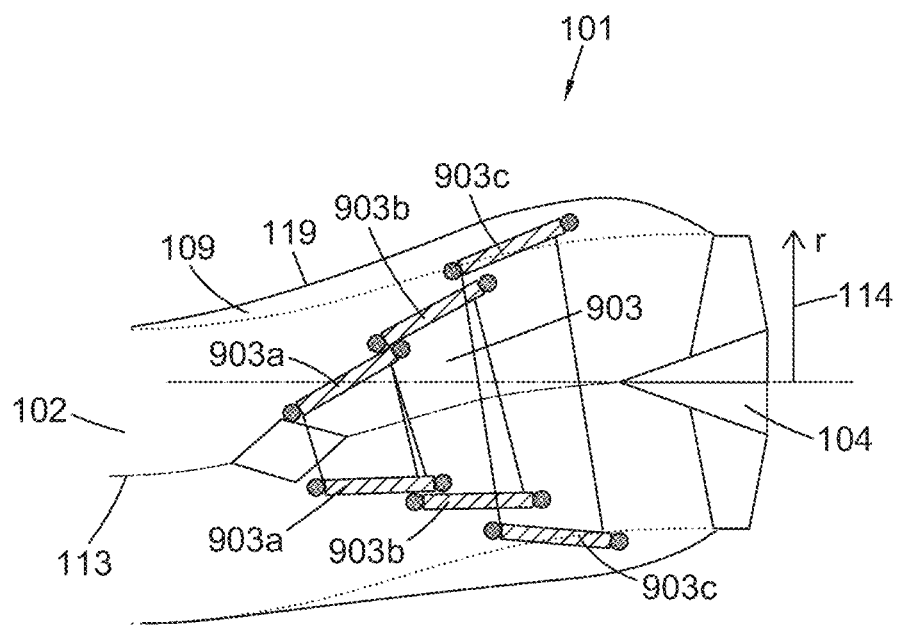
FIGS. 12A to 12C show cross-sectional schematic views of precooled engines each having three conical radially spaced modular heat exchangers arranged in series orientated along the curved centreline of the engine air intake.
Figure 12B:
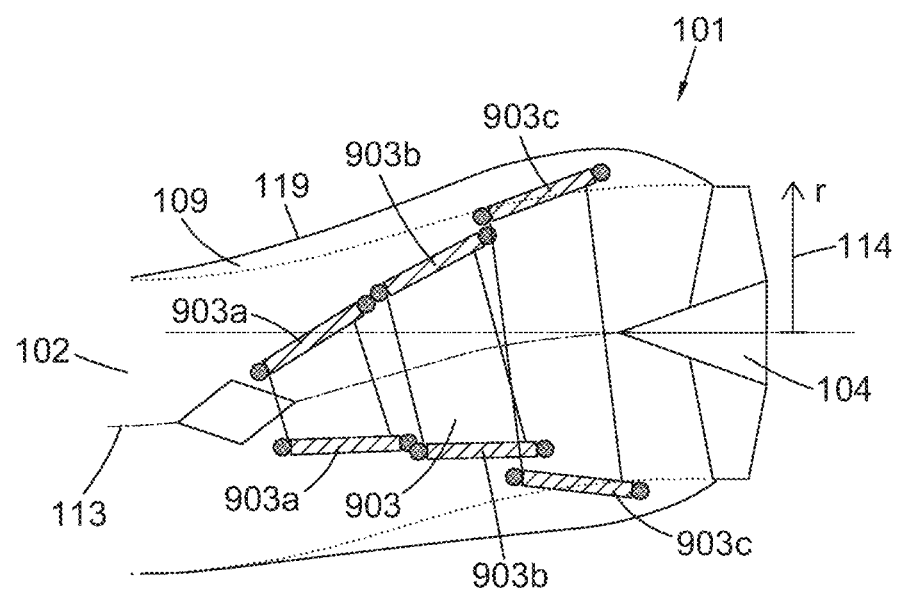
Figure 12C:
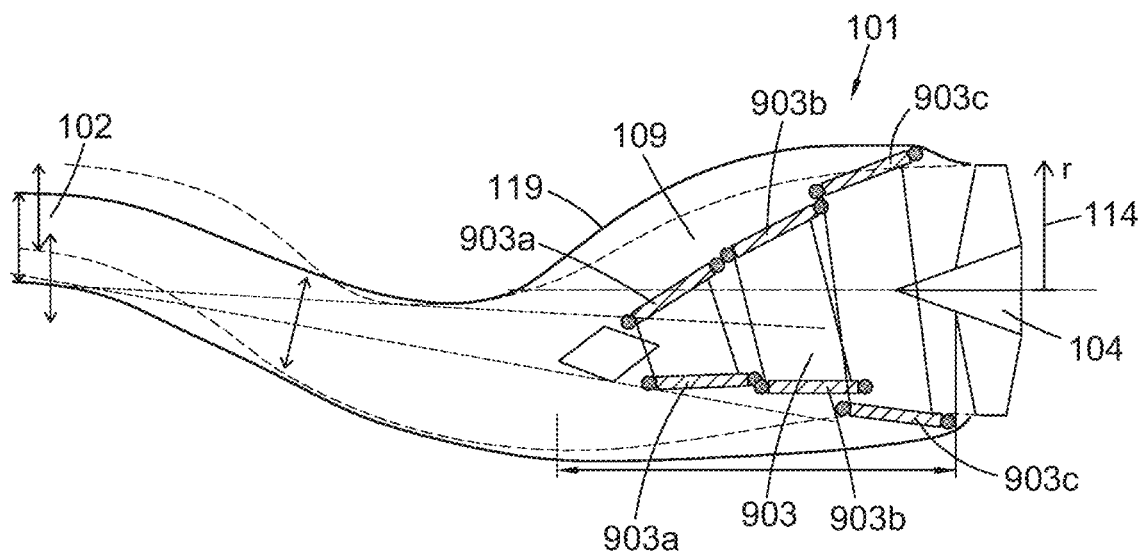
Figure 12D:
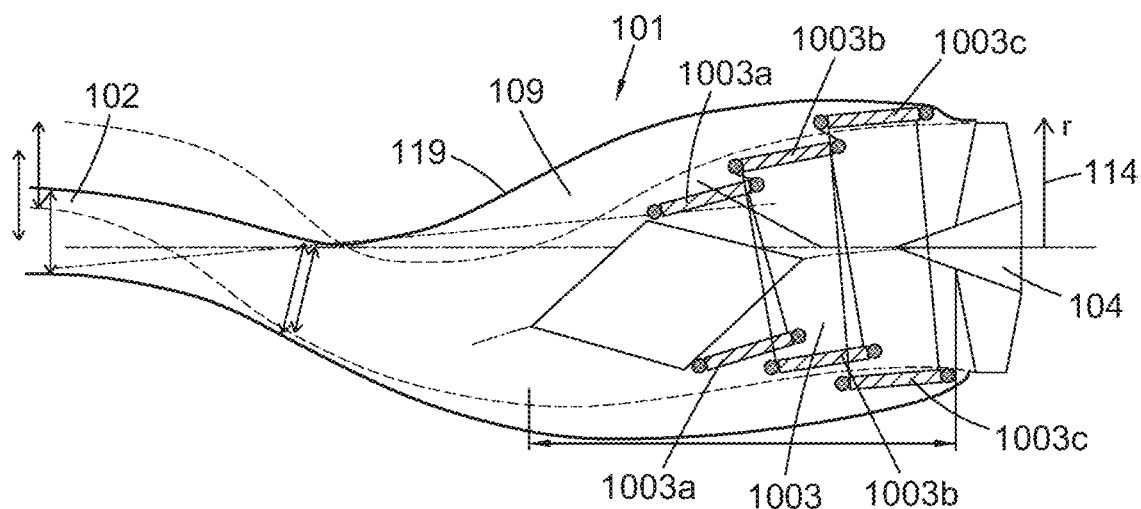
FIG. 12D shows a cross-sectional schematic view of a precooled engine having three cylindrical radially spaced modular heat exchangers arranged in series orientated along the curved centreline of the engine air intake.

In the exemplary arrangements shown in FIGS. 12A to 12C, the heat exchanger arrangement 903 comprises first, second and third heat exchanger modules 903a-c that are each substantially conical in shape and are arranged in series along the longitudinal axis 113 of the engine 101. In the example shown in FIG. 12D, the heat exchanger arrangement 1003 comprises first, second and third heat exchanger modules 1003a-c that are each substantially cylindrical in shape and are arranged in series along the longitudinal axis 113 of the engine 101.

In the examples shown in FIGS. 12A to 12D, the longitudinal axis 113 of the engine 101 is curved, i.e. there is some degree of convolution in the air intake arrangement 102. It is desirable in many applications for the heat exchanger arrangement 903 to be closely integrated with the air intake arrangement 102. The use of multiple modular heat exchanger modules such as the modules 903a-c or 1003a-c can facilitate this integration by careful arrangement of the axial positioning, orientation and size of the heat exchanger modules. Furthermore, multiple modular heat exchanger modules may be positioned and orientated such that there is complete protection from debris and particles that follow a mostly ballistic trajectory (rather than being carried along aerodynamic streamlines).

According to the above, and with reference to the exemplary heat exchanger arrangements 103, 203, 303, 403, 503, 603, 703, 803, 903 and 1003 as shown in FIGS. 2 and 4 to 12D, it is to be understood that a heat exchanger arrangement according to the present disclosure may comprise any combination of the following features:

(a) the heat exchanger arrangement may comprise any number of one or more individual heat exchanger modules;

(b) the one or more heat exchanger modules may be arranged either in series or in parallel relative to the longitudinal axis of the engine;

(c) the one or more heat exchanger modules may be either substantially cylindrical or conical in shape;

(d) the respective lengths of the one or more heat exchanger modules may be the same or different;

(e) the respective spacing and positioning of the tubes inside each of the one or more heat exchanger modules may be different in each of the heat exchanger modules;

(f) the lengths of one or more of the heat exchanger modules may be at least partially overlapping along the longitudinal axis of the engine and/or (g) the longitudinal axis of the engine may be either straight or curved (i.e. convoluted).

Figure 13:
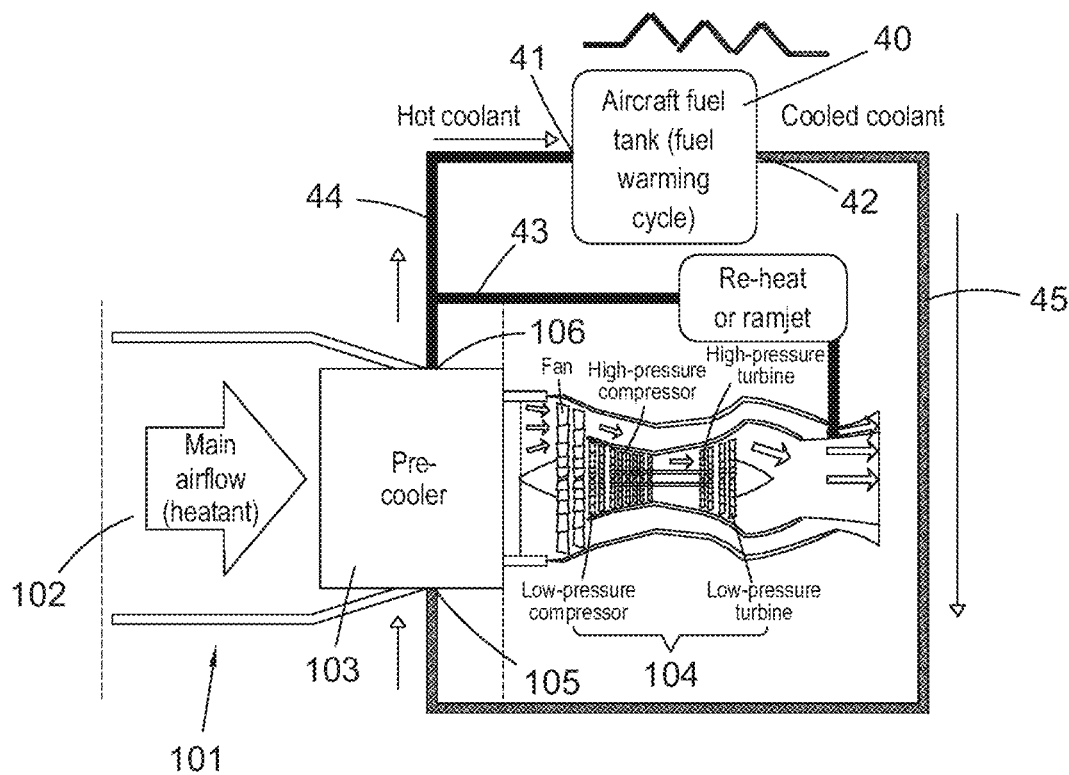
FIG. 13 shows a schematic diagram of an engine cycle operating at a high flight speed wherein the heat transfer medium heats the fuel.
Figure 14:
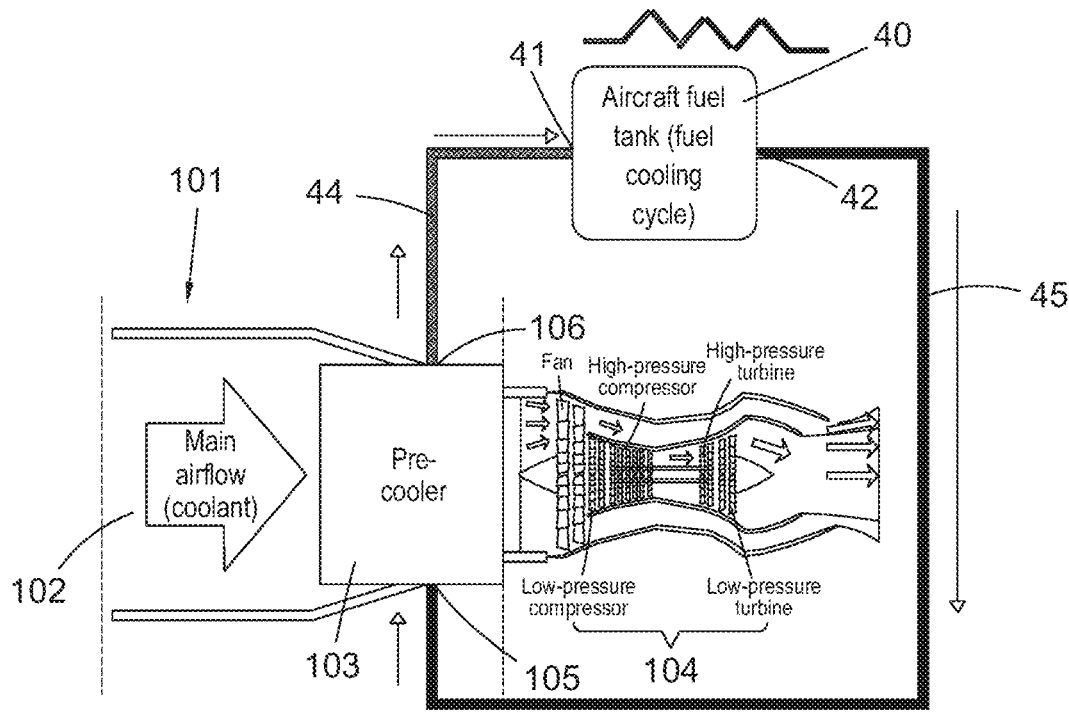
FIG. 14 shows a schematic diagram of an engine cycle operating at a low flight speed wherein the heat transfer medium cools the fuel.

Advantageously, any of the heat exchanger arrangements as described above may be used to help manage the temperature of a fuel tank. FIGS. 13 and 14 show schematic cycle diagrams in which the heat exchanger arrangement 103 (though it is also envisaged that any of the alternative heat exchangers 203, 303, 403, etc. described above could be employed instead of the heat exchanger arrangement 103) is used to cool the air which enters the air intake arrangement 102. The engine 101 further includes a fuel tank 40 that is configured to store a fuel (not shown) that can be combusted in an air-breathing combustion chamber (not shown) that is supplied with air compressed by a compressor of the turbomachinery components 104.

FIG. 13 represents a first operating mode of the heat exchanger arrangement 103, which corresponds with a high operating flight speed of the engine 101, for example, a short duration hypersonic "dash" mode. In the first operating mode of the heat exchanger arrangement 103, a portion of the heat transfer medium is configured to flow out from the outlet 106 of the heat exchanger arrangement 103 along a first flow path 43, to be fed downstream of the turbomachinery components 104 to be used for re-heating and/or a Ramjet mode of operating the engine 101. Also in the first operating mode, a portion of the heat transfer medium is configured to flow out from the outlet 106 along a second flow path 44, into an inlet 41 of the fuel tank 40, before then being placed in heat exchange with the fuel in the fuel tank 40. The heat transfer medium is then configured to exit the fuel tank 40 via an outlet 42, and then to flow along a third flow path 45 towards the inlet 105 where it re-enters the heat exchanger arrangement 103.

In this manner, in the first operating mode of the heat exchanger arrangement 103, hot heat transfer medium which exits the heat exchanger arrangement 103 after it has been used to cool the air flowing through the heat exchanger arrangement 103 is used to heat the fuel in the fuel tank 40. Cold heat transfer medium (which has been cooled as a result of heating the fuel) exiting the fuel tank 40 is then fed back into the heat exchanger arrangement 103 where it is used to cool the air flowing through the heat exchanger arrangement 103. This mode of operation of the heat exchanger arrangement 103 is thus particularly advantageous because it provides that during high speed operation of the engine 101, for example during a short duration hypersonic "dash" mode, during acceleration to high speed, heat removed into the heat transfer medium by cooling the incoming air can be dissipated (i.e. dumped) in the fuel tank 40. The fuel volume in the fuel tank 40 thus represents a heat reservoir facilitating further cooling of the air. In other words, the fuel provides a good medium for dumping heat out from the heat transfer medium, and dumping heat from the heated heat transfer medium into the fuel thus helps cool the air.

Turning now to FIG. 14, in a second operating mode of the heat exchanger arrangement 103, which corresponds with a low operating flight speed of the engine 101, for example, a long duration supersonic or subsonic cruise, the heat transfer medium can instead be used to cool the fuel. In the second operating mode of the heat transfer arrangement 103, the first fluid is configured to flow out from the outlet 106 of the heat exchanger arrangement 103 along the second flow path 44, into the inlet 41 of the fuel tank 40. The first fluid is then configured to exit the fuel tank 40 via the outlet 42, and then to flow along the third flow path 45 towards the inlet 105 where it re-enters the heat exchanger arrangement 103.

In this manner, in the second operating mode of the heat exchanger arrangement 103, heat transfer medium which exits the heat exchanger arrangement 103 after it has been used to warm the air flowing through the heat exchanger arrangement 103 is used to cool the fuel in the fuel tank 40. Hot heat transfer medium (which has been heated as a result of cooling the fuel) exiting the fuel tank 40 is then fed back into the heat exchanger arrangement 103 where it is used to warm the air flowing through the heat exchanger 103. The second operating mode of the heat exchanger arrangement 103 is thus particularly advantageous because it provides that during low speed operation of the engine 101, for example during a long duration supersonic or subsonic cruise, heat dumped into the fuel from the heat transfer medium during the first operating mode of the heat exchanger arrangement 103 can be transferred back into the heat transfer medium. This allows for the operation of the heat exchanger arrangement 103 in the first operating mode to be potentially repeated. In other words, without the second operating mode of the heat exchanger arrangement 103, it might not otherwise be possible to keep on using the first operating mode of the heat exchanger arrangement 103, because the fuel would ultimately reach a temperature limit. By using both the first and second operating modes of the heat exchanger 103 to run the cycle forwards (FIG. 13) and in reverse (14), the heat transfer medium can effectively be used as both a heat source and a heat sink for the fuel. Specifically, the temperature of the fuel needs to be managed in order to effectively use the fuel as a heat sink for helping the heat transfer medium to more effectively cool the air. In the first operating mode of the heat exchanger arrangement 103, the fuel provides a good medium for heat from the heat transfer medium to be dumped into, to help further cool the air, and in the second operating mode of the heat exchanger arrangement 103, the fuel is cooled down so that the first operating mode can be repeated/used again.

Figure 15A:
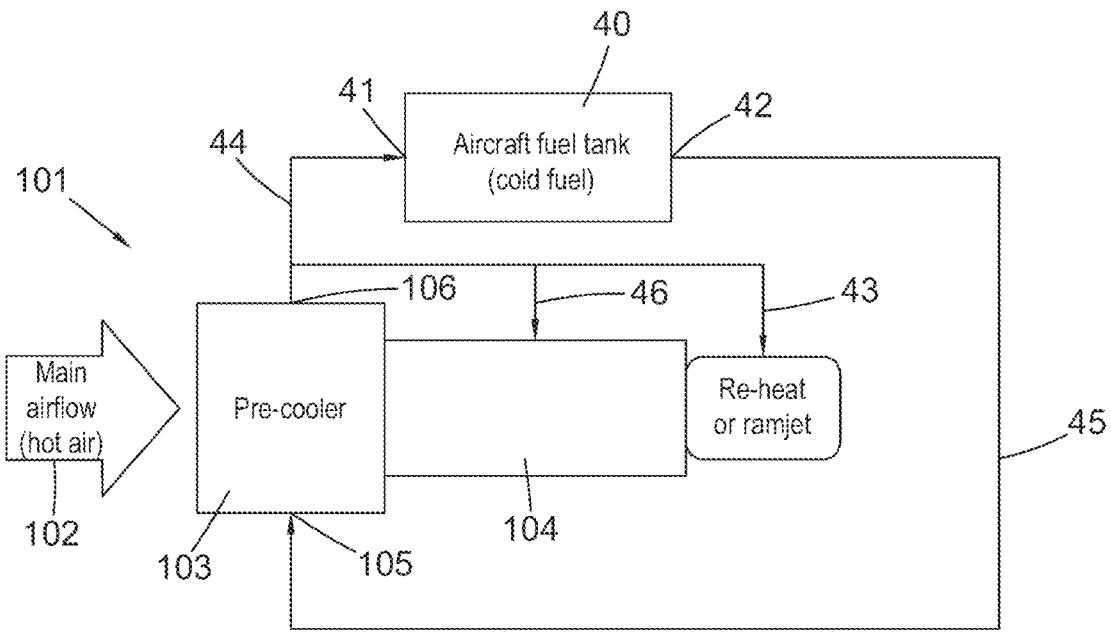
FIG. 15A shows a schematic diagram of an engine cycle operating at a high flight speed wherein the heat transfer medium is a fuel and the fuel is heated through heat transfer with the air.

FIG. 15A shows an alternative exemplary first operating mode of the heat exchanger arrangement 103, which corresponds with a high operating flight speed of the engine 101, for example, a short duration hypersonic "dash" mode, in which the fuel is used as the heat transfer medium. In the first operating mode example shown in FIG. 15A, the fuel is heated, by being in heat exchange with the air. In the first operating mode of the heat exchanger arrangement 103 shown in the example, a portion of the heat transfer medium (i.e. the fuel) is configured to flow out from the outlet 106 of the heat exchanger arrangement 103 along a first flow path 43, to be fed downstream of the turbomachinery components 104 to be used for re-heating and/or a Ramjet mode of operating the engine 101. A portion of the heat transfer medium (i.e. the fuel) is also configured to flow out from the outlet 106 of the heat exchanger arrangement 103 along a fourth flow path 46, to be fed into the one or more turbomachinery components 104. Also in the first operating mode, a portion of the heat transfer medium (i.e. the fuel) is configured to flow out from the outlet 106 along a second flow path 44, into an inlet 41 of the fuel tank 40. The fuel is then configured to exit the fuel tank 40 via an outlet 42, and then to flow along a third flow path 45 towards the inlet 105 where it re-enters the heat exchanger arrangement 103.

Figure 15B:
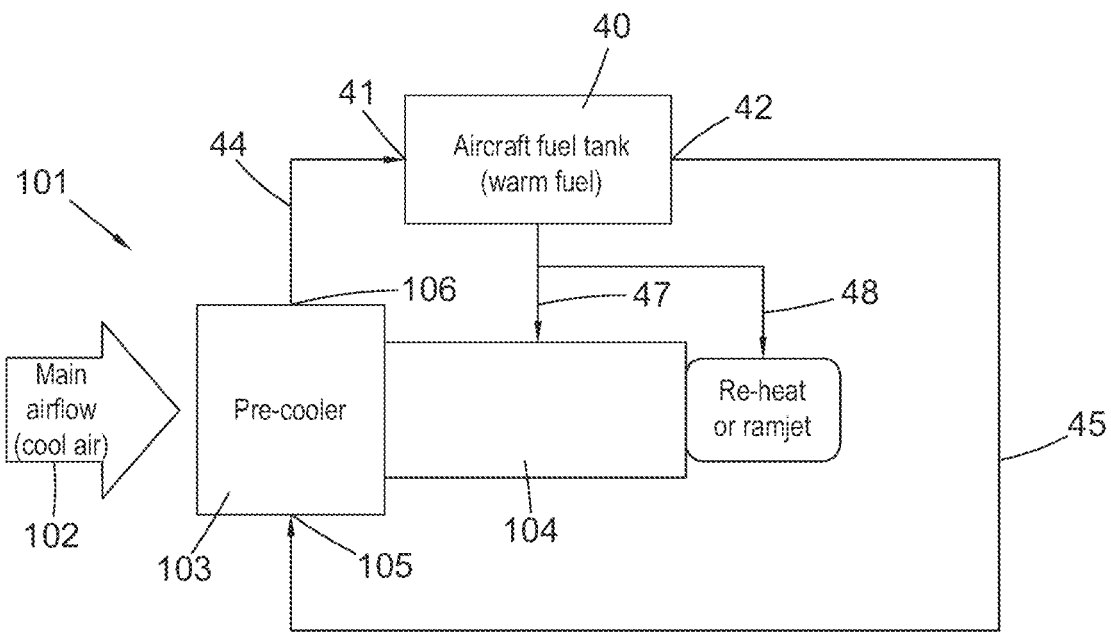
FIG. 15B shows a schematic diagram of an engine cycle operating at a low flight speed wherein the heat transfer medium is a fuel and the fuel is cooled through heat transfer with the air.

Turning now to FIG. 15B, in a second operating mode of the heat exchanger arrangement 103 shown in FIG. 15A, which corresponds with a low operating flight speed of the engine 101, for example, a long duration supersonic or subsonic cruise, the fuel is cooled, by being in heat exchange with the air. In the second operating mode of the heat exchanger arrangement 103 show in the example of FIG.

15B, the heat transfer medium (i.e. the fuel) is configured to flow out from the outlet 106 of the heat exchanger arrangement 103 along the second flow path 44, into the inlet 41 of the fuel tank 40. A portion of the heat transfer medium (i.e. the fuel) is configured to flow out from the fuel tank 40 along a fifth flow path 47 to be fed into the one or more turbomachinery components 104, and another portion of the heat transfer medium (i.e. the fuel) is configured to flow out from the fuel tank 40 along a sixth flow path 48 to be fed downstream of the one or more turbomachinery components 104 to be used for re-heating and/or a Ramjet mode of operating the engine 101. The heat transfer medium (i.e. the fuel) is, after some of the heat from the fuel tank 40 has been dumped by feeding it to the one or more turbomachinery components 104 and downstream of the turbomachinery components for re-heating and/or a Ramjet mode, then configured to exit the fuel tank 40 via the outlet 42, and then to flow along the third flow path 45 towards the inlet 105 where it re-enters the heat exchanger arrangement 103.

In this manner, in the example shown in FIGS. 15A and 15B, in the first operating mode of the heat exchanger arrangement 103, hot fuel which exits the heat exchanger arrangement 103 after it has been used to cool the air flowing through the heat exchanger arrangement 103 is used to heat the rest of the fuel in the fuel tank 40. Fuel exiting the fuel tank 40 is then fed back into the heat exchanger arrangement 103 where it is used to cool the air flowing through the heat exchanger arrangement 103. This mode of operation of the heat exchanger arrangement 103 is thus particularly advantageous because it provides that during high speed operation of the engine 101, for example during a short duration hypersonic "dash" mode, during acceleration to high speed, heat removed into the fuel by cooling the incoming air can be dissipated (i.e. dumped) in the fuel tank 40. The fuel volume in the fuel tank 40 thus represents a heat reservoir facilitating further cooling of the air. In other words, the fuel tank 40 provides a good medium for dumping heat out from the heat transfer medium, and dumping heat from the fuel into the fuel tank 40 thus helps cool the air. Then, in the second operating mode of the heat exchanger arrangement 103, the fuel is cooled down so that the first operating mode can be repeated/used again.

Figure 16A:
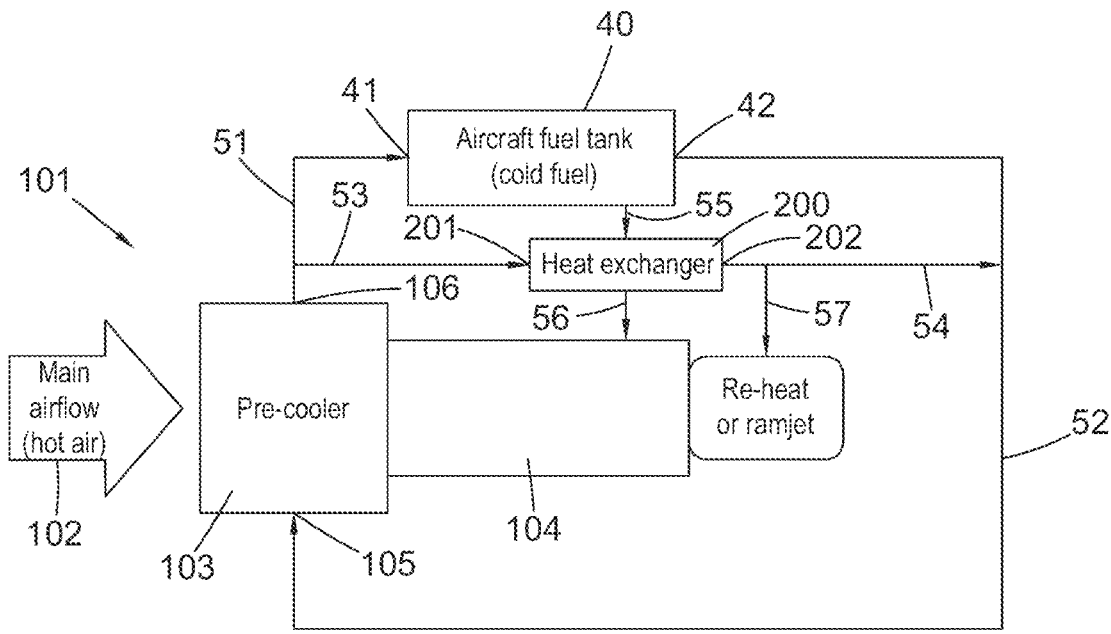
FIG. 16A shows a schematic diagram of an engine cycle operating at a high flight speed wherein the heat transfer medium heats the fuel.
Figure 16B:
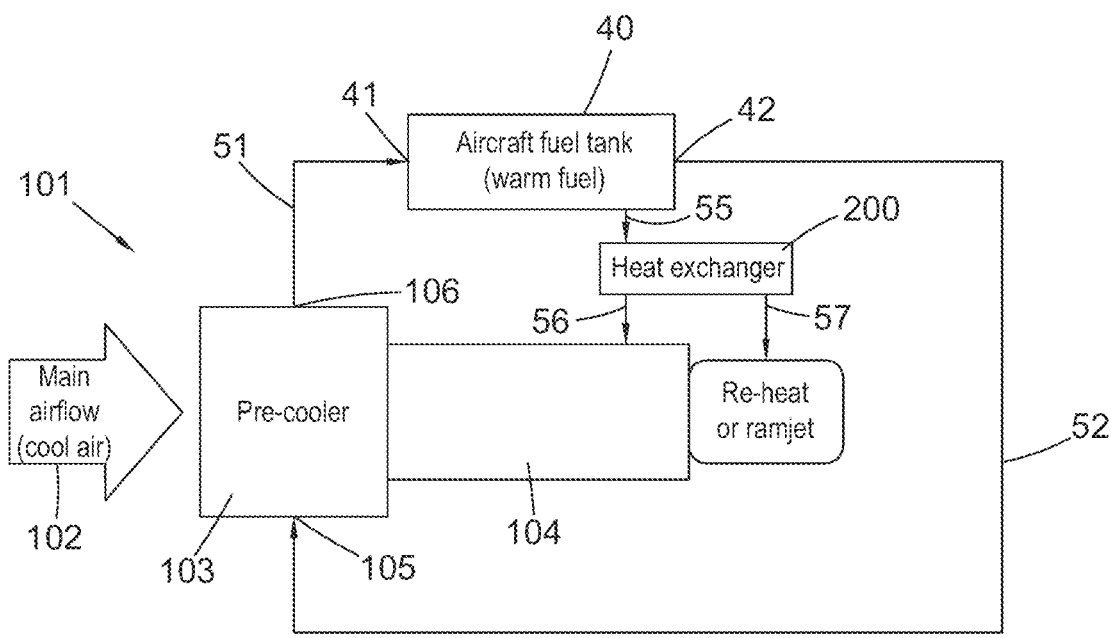
FIG. 16B shows a schematic diagram of an engine cycle operating at a low flight speed wherein the heat transfer medium cools the fuel.

FIG. 16A shows another alternative exemplary first operating mode of the heat exchanger arrangement 103, which corresponds with a high operating flight speed of the engine 101, for example, a short duration hypersonic "dash" mode, in which a fluid that is separate to and different to the fuel in the fuel tank 40 is used as the heat transfer medium. In the example shown in FIGS. 16A and 16B, the engine 101 further comprises a second heat exchanger arrangement 200. The second heat exchanger arrangement 200 is configured to provide for heat exchange between the fuel in the fuel tank 40 and the heat transfer medium. In FIGS. 16A and 16B, the solid black arrows represent the flow of the fuel, and the black arrows with a white fill represent the flow of the heat transfer medium.

In the first operating mode of the heat exchanger arrangement 103 shown in FIG. 16A, the fuel is heated. A portion of the heat transfer medium is configured to flow out from the outlet 106 of the heat exchanger arrangement 103 along a flow path 51, to be fed into the inlet 41 of the fuel tank 40, before then being placed in heat exchange with the fuel in the fuel tank 40. The first heat transfer medium is then configured to exit the fuel tank 40 via the outlet 42, and then to flow along a flow path 52 towards the inlet 105 where it re-enters the heat exchanger arrangement 103. Also, a portion of the first heat transfer medium is configured to flow along a flow path 53 into an inlet 201 of the second heat exchanger arrangement 200, before exiting the second heat exchanger arrangement 200 via an outlet 202 thereof, along a flow path 54, before flowing back into the inlet 105 of the heat exchanger arrangement 103 via the flow path 52.

The heat transfer medium is placed in heat exchange with the fuel in the second heat exchanger arrangement 200. As shown in FIG. 16A, a portion of the fuel is configured to be fed from the fuel tank 40 to the second heat exchanger arrangement 200 via a flow path 55. Then, a portion of the fuel is configured to be fed from the second heat exchanger arrangement 200 into the one or more turbomachinery components 104 via a flow path 56, and a portion of the fuel is configured to be fed from the second heat exchanger arrangement 200 to be fed downstream of the turbomachinery components 104 to be used for re-heating and/or a Ramjet mode of operating the engine 101, via a flow path 57. In this way, some of the heat from the fuel tank 40 can be added to the engine cycle by feeding it to the one or more turbomachinery components 104 and downstream of the turbomachinery components for re-heating and/or a Ramjet mode.

Turning now to FIG. 16B, in a second operating mode of the heat exchanger arrangement 103 shown in FIGS. 16A and 16B, which corresponds with a low operating flight speed of the engine 101, the fuel is cooled. In the second operating mode of the heat exchanger arrangement 103, the heat transfer medium is configured to flow out from the outlet 106 of the heat exchanger arrangement 103 along the flow path 51, to be fed into the inlet 41 of the fuel tank 40, before then being placed in heat exchange with the fuel in the fuel tank 40. The heat transfer medium is then configured to exit the fuel tank 40 via the outlet 42, and then to flow along the flow path 52 towards the inlet 105 where it re-enters the heat exchanger arrangement 103. A portion of the fuel is configured to be fed from the fuel tank 40 to the second heat exchanger arrangement 200 via a flow path 55. Then, a portion of the fuel is configured to be fed from the second heat exchanger arrangement 200 into the one or more turbomachinery components 104 via a flow path 56, and a portion of the fuel is configured to be fed from the second heat exchanger arrangement 200 to be fed downstream of the turbomachinery components 104 to be used for re-heating and/or a Ramjet mode of operating the engine 101, via a flow path 57.

In this manner, in the example shown in FIGS. 16A and 16B, like in the examples shown in FIGS. 13 through to 15B, in the first operating mode of the heat exchanger arrangement 103, the fuel volume in the fuel tank 40 represents a heat reservoir facilitating further cooling of the air. Then, in the second operating mode of the heat exchanger arrangement 103, the fuel is cooled down so that the first operating mode can be repeated/used again. Advantageously, in the example shown in FIGS. 16A and 16B, by use of the second heat exchanger arrangement 200, in the first and second operating modes of the heat exchanger arrangement 103, heat in the fuel/fuel tank 40 can advantageously be added to the engine cycle by feeding into to be utilised in the one or more turbomachinery components 104 and also used for re-heating and/or a Ramjet mode of operating the engine 101.

From the examples described above and shown in FIGS. 13 through to 16B, it is apparent that in operation of the engine 101, a fuel may be used as the heat transfer medium, or that the heat transfer medium may be a separate and different fluid to the fuel, and/or that the fuel may further be placed in heat exchange in a second heat exchanger arrangement.

It should be understood that the disclosure also includes an aircraft, flying machine or aerospace vehicle comprising an engine 101 as described herein.

Various modifications may be made to the described embodiment(s) without departing from the scope of the invention as defined by the accompanying claims.

The invention claimed is:

1. An engine, comprising:
an air intake arrangement configured to receive air;
a heat exchanger arrangement arranged downstream of the air intake arrangement, configured to cool the air, and comprising a plurality of heat exchanger modules; and
one or more turbomachinery components configured to receive cooled air from the heat exchanger arrangement;
wherein:
the plurality of heat exchanger modules are each arranged to be generally centred on and to be arranged along a longitudinal axis of the engine; and
at least one of the plurality of heat exchanger modules is arranged to partially overlap with at least one other one of the plurality of heat exchanger modules relative to the longitudinal axis of the engine,
wherein each of the plurality of heat exchanger modules has a respective length, and wherein at least one of the plurality of heat exchanger modules is arranged such that its respective length only partially overlaps with the respective length of at least one other one of the plurality of heat exchanger modules, relative to the longitudinal axis of the engine.

2. An engine as claimed in claim 1, wherein a first one of the plurality of heat exchanger modules has a first length that only partially overlaps with a second length of a second one of the plurality of heat exchanger modules, and wherein the first and second lengths do not completely overlap with each other.

3. An engine as claimed in claim 2, wherein the first and second ones of the plurality of heat exchanger modules are configured such that an outlet for heat transfer medium of the first one of the plurality of heat exchanger modules is fluidly coupled to an inlet for heat transfer medium of the second one of the plurality of heat exchanger modules.

4. An engine as claimed in claim 2, wherein the first and second ones of the plurality of heat exchanger modules are configured such that flow of heat transfer medium in the first one of the plurality of heat exchanger modules is controllable independently of flow of heat transfer medium in the second one of the plurality of heat exchanger modules.

5. An engine as claimed in claim 1, wherein one or more of each of the plurality of heat exchanger modules is at least partially substantially cylindrical or conical in shape.

6. An engine as claimed in claim 1, wherein each of the plurality of heat exchanger modules has a respective inner diameter and a respective outer diameter, and wherein at least one of the plurality of heat exchanger modules has a different inner and/or outer diameter than at least one other one of the plurality of heat exchanger modules.

7. An engine as claimed in claim 1, wherein the longitudinal axis of the engine is at least partially curved, and the plurality of heat exchanger modules are orientated along the longitudinal axis of the engine.

8. An engine as claimed in claim 1, wherein at least one of the heat exchanger modules has a different length to at least one other one of the plurality of heat exchanger modules.

9. An engine as claimed in claim 1, wherein each of the plurality of heat exchanger modules comprises a plurality of tubes for the flow of a heat transfer medium in heat exchange with the air.

10. An engine as claimed in claim 9, wherein the plurality of tubes in at least one of the plurality of heat exchanger modules are spaced apart and positioned relative to one another such that said one of the plurality of heat exchanger modules is configured to provide an angle to a bulk flow of the air flowing through the heat exchanger arrangement.

11. An engine as claimed in claim 9, wherein the one or more turbomachinery components comprises a compressor, and the engine further comprises an air-breathing combustion chamber configured to receive compressed air from the compressor and for the combustion of air and fuel;
wherein the heat exchanger arrangement is configured to be selectively operated in a first operating mode which corresponds with a first operating flight speed of the engine, and a second operating mode which corresponds with a second operating flight speed of the engine that is lower than the first operating flight speed of the engine;
wherein in the first operating mode of the heat exchanger arrangement, the heat transfer medium is configured to heat the fuel before it is delivered to the air-breathing combustion chamber; and
wherein in the second operating mode of the heat exchanger arrangement, the heat transfer medium is configured to cool the fuel before it is delivered to the air-breathing combustion chamber.

12. An engine as claimed in claim 1, wherein the engine further comprises a bypass arrangement configured to prevent the air received by the air intake arrangement from flowing through at least one of the plurality of heat exchanger modules.

13. An engine as claimed in claim 1, wherein each of the plurality of heat exchanger modules is at least partially substantially conical in shape.

14. An engine as claimed in claim 13, wherein the plurality of heat exchanger modules are arranged in series or in parallel relative to a longitudinal axis of the engine.

15. An engine as claimed in claim 13, wherein each of the plurality of heat exchanger modules comprises a plurality of tubes for the flow of a heat transfer medium in heat exchange with the air.

16. An engine as claimed in claim 15, wherein the plurality of tubes in at least one of the plurality of heat exchanger modules are spaced apart and positioned relative to one another such that said one of the plurality of heat exchanger modules is configured to provide an angle to a bulk flow of the air flowing through the heat exchanger arrangement.

17. An engine as claimed in claim 13, wherein the engine further comprises a bypass arrangement configured to prevent the air received by the air intake arrangement from flowing through at least one of the plurality of heat exchanger modules.

18. An engine as claimed in claim 1, further comprising:
a fuel tank configured to store a fuel for being supplied to an air-breathing combustion chamber; and
a compressor arranged downstream of the heat exchanger arrangement and configured to supply compressed air to the air-breathing combustion chamber for the combustion of the air and the fuel;

wherein the heat exchanger arrangement is configured to cool the air by providing for heat exchange between the air and a heat transfer medium;

wherein the heat exchanger arrangement is configured to be selectively operated in a first operating mode which corresponds with a first operating flight speed of the engine, and a second operating mode which corresponds with a second operating flight speed of the engine that is lower than the first operating flight speed of the engine;

wherein in the first operating mode of the heat exchanger arrangement, the heat transfer medium is configured to heat the fuel before the fuel is delivered to the air-breathing combustion chamber; and wherein in the second operating mode of the heat exchanger arrangement, the heat transfer medium is configured to cool the fuel before the fuel is delivered to the air-breathing combustion chamber.

19. A method of operating an engine as claimed in claim 18, the method comprising:

suppling air to the air intake arrangement;

causing the air to flow through the air intake arrangement, the heat exchanger arrangement, the compressor and the air-breathing combustion chamber;

supplying heat transfer medium to the heat exchanger arrangement;

causing the heat transfer medium to flow through the heat exchanger arrangement;

supplying fuel to the fuel tank; and causing the fuel to flow from the fuel tank to the air-breathing combustion chamber;

wherein the method further comprises operating the heat exchanger arrangement in the first operating mode when the engine is operating at the first operating flight speed, and operating the heat exchanger arrangement in the second operating mode when the engine is operating at the second operating flight speed.

20. An aircraft, flying machine or aerospace vehicle comprising an engine as claimed in claim 1.

* * * * *